(12) United States Patent  
Seo

(10) Patent No.: US 11,348,251 B2  
(45) Date of Patent: May 31, 2022

(54) DEVICE AND METHOD FOR DETERMINING EDGE LOCATION BASED ON ADAPTIVE WEIGHING OF GRADIENTS

(71) Applicant: KYUNGPOOK NATIONAL UNIVERSITY INDUSTRY—ACADEMIC COOPERATION FOUNDATION, Daegu (KR)

(72) Inventor: Suyoung Seo, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 16/959,527

(22) PCT Filed: Dec. 20, 2018

(86) PCT No.: PCT/KR2018/016382  
§ 371 (c)(1),  
(2) Date: Jul. 1, 2020

(87) PCT Pub. No.: WO2019/135524  
PCT Pub. Date: Jul. 11, 2019

(65) Prior Publication Data  
US 2021/0065373 A1 Mar. 4, 2021

(30) Foreign Application Priority Data  
Jan. 3, 2018 (KR) .................... 10-2018-0000849

(51) Int. Cl.  
*G06T 7/13* (2017.01)

(52) U.S. Cl.  
CPC .................... *G06T 7/13* (2017.01)

(58) Field of Classification Search  
CPC ........................................... G06T 7/13  
See application file for complete search history.

(56) References Cited

U.S. PATENT DOCUMENTS 8,559,746 B2 * 10/2013 Adams .................. G06T 3/403  
                                                                        382/264  
10,803,116 B2 * 10/2020 Brailovsky ............ G06V 10/50

(Continued)

FOREIGN PATENT DOCUMENTS

| JP | H07-182522 A | 7/1995 |
|----|---|---|
| JP | 2005-122361 A | 5/2005 |
| JP | 2007-213125 A | 8/2007 |
| KR | 10-2011-0065491 A | 6/2011 |

(Continued)

OTHER PUBLICATIONS

International Search Report and Written Opinion for related International Application No. PCT/KR2018/016382, dated Apr. 8, 2019; English translation of ISR provided (9 pages).

(Continued)

*Primary Examiner* — Pinalben Patel  
(74) *Attorney, Agent, or Firm* — Procopio, Cory, Hargreaves & Savitch LLP

(57) ABSTRACT

Provided are a device and a method for determining an edge location based on the adaptive weighting of gradients (AWG). The method for determining an edge location according to an embodiment of the present invention includes the steps of determining, based on the edge width of an edge profile in an image, a power factor to be applied to a gradient of the edge profile in order to determine an edge location, calculating a difference value between values of adjacent pixels in the edge profile to generate the gradient, and applying the power factor determined based on the edge width to the gradient to determine the edge location.

19 Claims, 11 Drawing Sheets

(56) References Cited

U.S. PATENT DOCUMENTS

2008/0159630 A1* 7/2008 Sharon .................. G06T 7/13
                                                    382/199
2013/0182961 A1* 7/2013 Tay ..................... G02B 7/36
                                                    382/199

FOREIGN PATENT DOCUMENTS

| KR | 10-2012-0040764 A | 4/2012 |
|----|-------------------|--------|
| KR | 10-1619327 B1 | 5/2016 |
| KR | 10-1733028 B1 | 5/2017 |
| KR | 10-1777696 B1 | 9/2017 |
| WO | 2010/027686 A2 | 3/2010 |

OTHER PUBLICATIONS

Lyvers, E. P. et al, "Subpixel Measurement Using a Moment-Based Edge Operator," IEEE Trans. Pattern Analysis and Machine Intelligence, vol. 11, No. 12, pp. 1293-1309, 1989, doi:10.1109/34.41367.

Tabatabai, A. J., et al., "Edge Localization to Subpixel Values in Digital Imagery," IEEE Trans. Pattern Analysis and Machine Intelligence, vol. PAMI-6, No. 2, pp. 188-201, 1984, doi:10.1109/TPAMI.1984.4767502.

Chen, P. et al. "Sub-Pixel Dimensional Measurement with Logistic Edge Model," Optik, vol. 125, No. 9, pp. 2076-2080, May 2014, doi:10.1016/ijleo.2013.10.020.

International Preliminary Report on Patentability for related International Application No. PCT/KR2018/016382, dated Jul. 7, 2020; English translation of ISR provided (13 pages).

* cited by examiner

DEVICE AND METHOD FOR DETERMINING EDGE LOCATION BASED ON ADAPTIVE WEIGHING OF GRADIENTS

TECHNICAL FIELD

The present invention relates to a device and a method for determining an edge location, and more particularly, to a device and a method for determining an edge location in which the location of an edge in an edge profile in an image is determined with sub-pixel accuracy based on the adaptive weighting of gradients.

BACKGROUND ART

In the field of image processing, an edge represents a boundary of an object the brightness value of which changes rapidly. The detection of an edge and the determination of the location thereof are essential procedures for extracting and recognizing an object from an image. For the accurate measurement of an object shape, it is necessary to determine the location of an edge location with the accuracy of sub-pixels. This is because while accurate modeling of an object is important in an industry supporting products having high precision, it is not possible to model the shape of an object to sufficient accuracy with the accuracy of edge determination methods limited in a pixel unit.

Among methods for determining an edge location with the accuracy of sub-pixels, there is a method for approximating an edge trace locally to a linear or a quadratic polynomial. These methods are not suitable for determining the location of an irregular curved edge with the accuracy of sub-pixels. In addition, a two-dimensional method for determining an edge location has a problem in that computational throughput increases and computational time increases as a kernel size increases.

DISCLOSURE OF THE INVENTION

Technical Problem

The present invention provides a device and a method for determining an edge location, the device and method capable of quickly and accurately determining, with a small amount of computation, an edge location of an edge profile with the accuracy of sub-pixels.

Problems to be solved by the present invention are not limited to the problems mentioned above. Other technical problems not mentioned herein will be clearly understood by those skilled in the art from the description below.

Technical Solution

Embodiments of the present invention provide methods for determining an edge location, the method including the steps of determining, based on the edge width of an edge profile in an image, a power factor to be applied to a gradient of the edge profile in order to determine an edge location, calculating a difference value between adjacent pixels in the edge profile to generate the gradient, and applying the power factor determined based on the edge width to the gradient to determine the edge location.

In some embodiments, the step of determining a power factor may include a step of determining, based on a correspondence relationship between a preset edge width and a power factor, the power factor corresponding to the edge width.

In other embodiments, the step of determining a power factor may include a step of determining, based on a preset kernel size and a correspondence relationship between an edge width and a power factor, the power factor corresponding to the kernel size of the edge profile and the edge width.

In still other embodiments, the method for determining an edge location may further include the steps of calculating the propagation of an error per power factor for predetermined edge profiles having various edge widths, and determining a power factor that generates a minimum error in the propagation of an error to calculate a correspondence relationship between the edge width and the power factor.

In even other embodiments, the step of calculating the propagation of an error may include the steps of calculating, for each of the edge profiles having various blur values, a gradient vector between values of adjacent pixels, generating a weighting vector to be applied to an edge profile per power factor applied to the gradient, calculating, based on the weighting vector, a partial derivative of an edge location for the weighting vector per power factor, calculating, based on the gradient, a partial derivative for a gradient of the weighting vector per power factor, calculating, based on a standard deviation of an error of each of the edge profiles, a dispersion of a gradient vector, and calculating, based on the dispersion of a gradient, the partial derivative of an edge location for the weighting vector, the partial derivative for the gradient of the weighting vector, a difference value between a predicted edge location and a true edge location per power factor, the propagation of the error per power factor.

In yet other embodiments, the step of calculating a correspondence relationship between the edge width and the power factor may include the step of determining, for each of the various blur values, a power factor that generates a minimum error in the propagation of an error to calculate a correspondence relationship between a blur and the power factor, calculating a correspondence relationship between the blur and edge widths of the edge profiles, and relating, based on the correspondence relationship between the blur and the power factor and the correspondence relationship between the blur and the edge width, the edge width directly to the power factor.

The partial derivative of an edge location for the weighting vector may be calculated according to Equation 1 below.

$$\frac{\partial l}{\partial w} = \frac{x}{\sum_{i=1}^{n-1} w_i} - \frac{\sum_{i=1}^{n-1} w_i x_i}{\left(\sum_{i=1}^{n-1} w_i\right)^2} \quad \text{[Equation 1]}$$

In Equation 1 above, l is an edge location, x is a vector representing the coordinate of the middle of the edge profile, $x_i$ is the coordinate value of the middle of i-th segment in the edge profile, w is the weighting vector, $w_i$ is a weight value of the i-th segment in the weighting vector, and n is the number of pixels in the edge profile.

The partial derivative for a gradient of the weighting vector may be calculated according to Equation 2 below.

$$\frac{\partial w}{\partial g} = \text{diag}(p \cdot g^{p-1}) \quad \text{[Equation 2]}$$

In Equation 2 above, w is the weighting vector, e is the gradient, and p is a power factor of the gradient.

The dispersion of the gradient may be calculated according to Equation 3 below.

$$D\{g\} = B \cdot \sigma_y^2 \cdot I_n B^T = \sigma_y^2 BB^T \quad \text{[Equation 3]}$$

$$\underset{(n-a)\times n}{B} = \begin{bmatrix} -1 & 1 & 0 & \cdots & 0 \\ 0 & -1 & 1 & \cdots & 0 \\ \vdots & \vdots & \vdots & \ddots & 0 \\ 0 & 0 & \cdots & -1 & 1 \end{bmatrix}$$

In Equation 3 above, D{g} is the dispersion of the gradient, $\sigma_y$ is a standard deviation of an error of a brightness value of the edge profile, n is the number of segments of the edge profile, and In is an identity matrix.

The propagation of an error may be calculated according to Equation 4 and Equation 5 below.

$$MSE\{l\} = D\{l\} + (l - l^{true})^2 \quad \text{[Equation 4]}$$

$$D\{l\} = \frac{\partial l}{\partial w} \times \frac{\partial w}{\partial g} \times D\{g\} \times \left[\frac{\partial w}{\partial g}\right]^T \times \left[\frac{\partial l}{\partial w}\right]^T \quad \text{[Equation 5]}$$

In Equation 4 and Equation 5, MSE{1} is the propagation of an error, D{1} is a dispersion of an edge location, D{g} is the dispersion of the gradient, $$\frac{\partial l}{\partial w}$$

is the partial derivative of the edge location for the weighting vector, $$\frac{\partial w}{\partial g}$$

is a partial derivative for the gradient of the weighting vector, and $1-1^{true}$ is a difference value between an estimated edge location and a true edge location.

In further embodiments, the method for determining an edge location may further include a step of calculating a blur value for an edge profile to predict an edge location, wherein the step of determining a power factor to be applied to a gradient may determine a power factor to be applied to a gradient of the edge profile according to the degree of the blur.

In still further embodiments, the step of determining a power factor to be applied to a gradient may include the steps of, when the blur value of the edge profile is greater than or less than 0.9, determining the power factor to be applied to the gradient based on the edge width of the edge profile, and when the blur value of the edge profile is in the range of 0.5 to 0.9, determining the power factor to be applied to the gradient of the edge profile with squared weighting.

In other embodiments of the present invention, provided is computer-readable recording media having recorded thereon a program for executing the method for determining an edge location.

In still other embodiments of the present invention, provided are devices for determining an edge location including at least one processor, wherein the processor, determines, based on the edge width of an edge profile in an image, a power factor to be applied to a gradient of the edge profile in order to determine an edge location, calculates a difference value between adjacent pixels in the edge profile to generate the gradient, and applies the power factor determined based on the edge width to the gradient to determine the edge location.

In some embodiments, the processor may, determine, based on a preset kernel size and a correspondence relationship between an edge width and a power factor, the power factor corresponding to the kernel size of the edge profile and the edge width.

In other embodiments, the processor may calculate the propagation of an error per power factor for predetermined edge profiles having various edge widths, and may determine a power factor that generates a minimum error in the propagation of an error to calculate a correspondence relationship between the edge width and the power factor.

In still other embodiments, the processor may calculate, for each of the edge profiles having various blur values, a gradient vector between values of adjacent pixels, generate a weighting vector to be applied to an edge profile per power factor applied to the gradient, calculate, based on the weight, a partial derivative of an edge location for the weighting vector per power factor, calculate, based on the gradient, a partial derivative for a gradient of the weighting vector per power factor, calculate, based on a standard deviation of an error of each of the edge profiles, a dispersion of a gradient vector, and calculate, based on the dispersion of a gradient, the partial derivative of an edge location for the weighting vector, the partial derivative for the gradient of the weighting vector, a difference value between a predicted edge location and a true edge location per power factor, the propagation of the error per power factor.

In even other embodiments, the processor may determine, for each of the various blur values, a power factor that generates a minimum error in the propagation of an error to calculate a correspondence relationship between a blur and the power factor, calculate a correspondence relationship between the blur and edge widths of the edge profiles, and relate, based on the correspondence relationship between the blur and the power factor and the correspondence relationship between the blur and the edge width, the edge width directly to the power factor.

In yet other embodiments, the processor may calculate a blur value for an edge profile to predict an edge location, and when the blur value of the edge profile is greater than or less than 0.9, may determine, based on the edge width of the edge profile, the power factor to be applied to the gradient, and when the blur value of the edge profile is in the range of 0.5 to 0.9, may determine the power factor to be applied to the gradient of the edge profile with squared weighting.

Advantageous Effects

According to an embodiment of the present invention, provided are a device and a method for determining an edge location, the device and method capable of quickly and accurately determining, with a small amount of computation, an edge location of an edge profile with the accuracy of sub-pixels.

The effects of the present invention are not limited to the effects described above. Other effects not mentioned herein will be clearly understood by those skilled in the art from the present specification and the accompanying drawings below.

MODE FOR CARRYING OUT THE INVENTION

Figure 1:
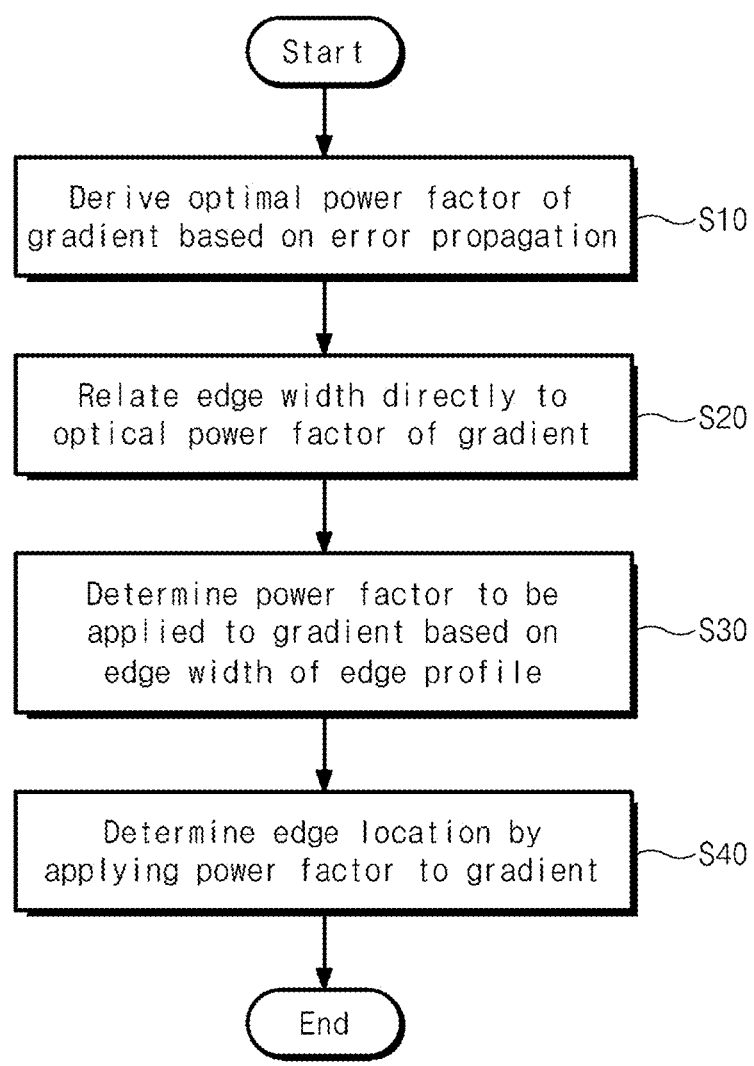
FIG. 1 is a flow chart of a method for determining an edge location according to an embodiment of the present invention.

Other advantages and features of the present invention, and methods to achieve the same will apparent when referring to embodiments described below in detail together with the accompanying drawings. However, the present invention is not limited to the embodiments set forth below, and the present invention is only defined by the scope of the claims. Although not defined, all terms (including technical or scientific terms) used herein have the same meaning as commonly accepted by conventional techniques in the prior art to which the invention belongs. The general description of known configurations may be omitted in order not to obscure the gist of the present invention. The same reference numerals are preferably used for the same or equivalent components in the drawings of the present invention. In order to help the understanding of the present invention, some components in the drawings may be somewhat exaggerated or reduced.

The terms used in the present application are only used to describe specific embodiments, and are not intended to limit the present invention. Singular expressions include plural expressions unless the context clearly indicates otherwise. In the present specification, it should be understood that the terms "include," "comprise," or "have" are intended to specify the presence of stated features, numbers, steps, operations, components, parts, or combinations thereof described in the specification, but do not preclude the presence or addition of one or more other features, numbers, steps, operations, components, parts, or combinations thereof.

As used throughout the present specification, a '~unit' is a unit for processing at least one function or operation, and may mean a hardware component such as software, FPGA, or ASIC. However, the '~unit' is not limited to software or hardware. The '~unit' may be configured to be in an addressable storage medium or may be configured to reproduce one or more processors.

As an example, the '~unit' may include components such as software components, object-oriented software components, class components and task components, processes, functions, attributes, procedures, subroutines, segments of program codes, drivers, firmware, micro-code, circuits, data, databases, data structures, tables, arrays, and variables. The functions provided by the components and the '~unit' may be performed separately by a plurality of components and '~units', or may be integrated with other additional components.

A device and a method for determining an edge location based on the adaptive weighting of gradients (AWG) according to embodiments of the present invention dynamically determines a power factor of a gradient adaptively to an edge width of an edge profile to determine an edge location with the accuracy of sub-pixels.

To this end, first, an edge profile in an image in which a true edge location is known is used to calculate a correspondence relationship between an edge width of the edge profile and a power factor by relating the edge width directly to the power factor based on an error propagation scheme. In one embodiment, edge profiles are used to find optimal power factors to calculate a correspondence relationship between a blur and a power factor, and then, for rapid processing, an edge width is directly related to the optimal power factors based on a correspondence relationship between the blur and the edge width.

According to another embodiment of the present invention, in order to increase the accuracy of the determination of an edge location according to the degree of a blur of an edge profile, the adaptive weighting of gradients (AWG) of a gradient or the squared weighting of gradients (SWG) of a gradient may be selectively applied according to the blur value of the edge profile to determine the edge location.

FIG. 1 is a flow chart of a method for determining an edge location according to an embodiment of the present invention. The method for determining an edge location according to an embodiment of the present invention may be performed by a device for determining an edge location including at least one processor and a memory. Steps constituting the method for determining an edge location may be executed by the processor. A program for executing each step of the method for determining an edge location may be recorded in the memory. The processor may be composed of a central processing unit (CPU), a graphic processing unit (GPU), a general purpose graphic processing unit (GPGPU), and the like.

Referring to FIG. 1, the method for determining an edge location according to an embodiment of the present invention is mainly composed of processes S10 to S20 of calculating a correspondence relationship between an edge width of an edge profile in which an edge location is known and a power factor of a gradient and processes S30 to S40 of determining an edge location of an edge profile using the correspondence relationship between the edge width and the power factor of the gradient.

First, in order to calculate the correspondence relationship of the edge width and the power factor of the gradient, using edge profiles in which true edge locations are known, a step S10 for deriving optimal power factors of gradients are performed based on error propagation.

Figure 2:
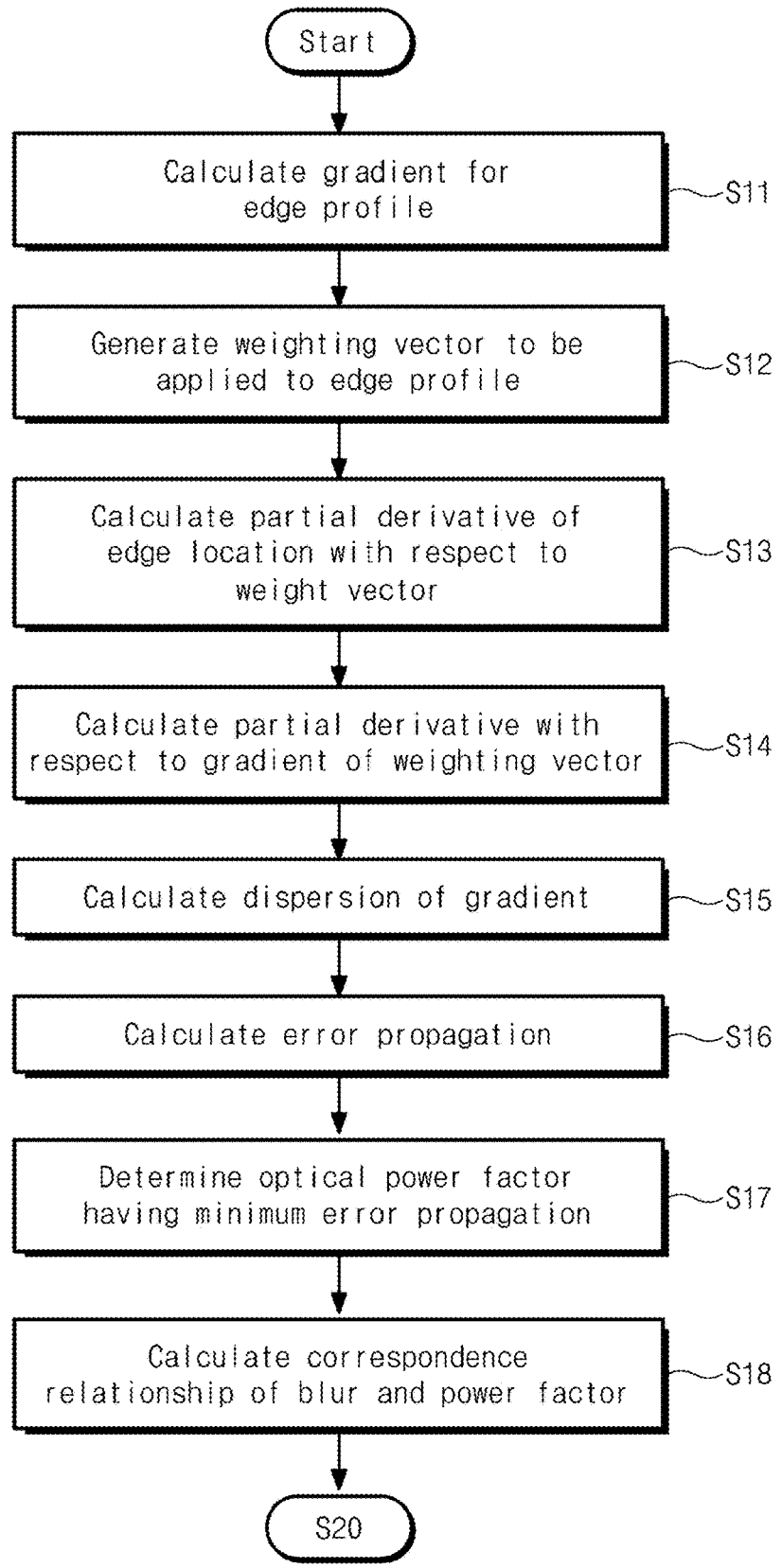
FIG. 2 is a flow chart of Step S10 of FIG. 1.

FIG. 2 is a flow chart of Step S10 of FIG. 1. In order to calculate of a blur of the edge profile and a power factor, a gradient is calculated for an edge profile in which a true edge location is known. S11. The gradient may be generated by calculating a difference value between values of adjacent (consecutive) pixels in the edge profile.

Edge profiles may be, for example, generated by simulation or obtained from an image captured of a target image in which a true edge location is known. Edge profiles may be generated to have various edge widths, various edge locations, and various kernel sizes.

Figure 3:
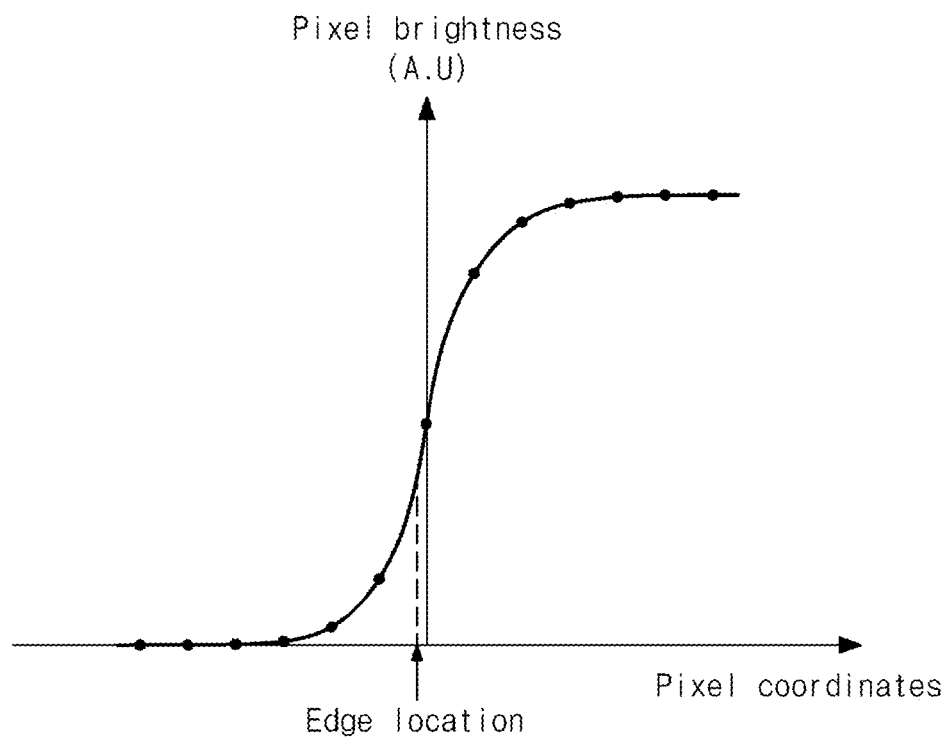
FIG. 3 is a diagram illustrating an edge profile.
Figure 4:
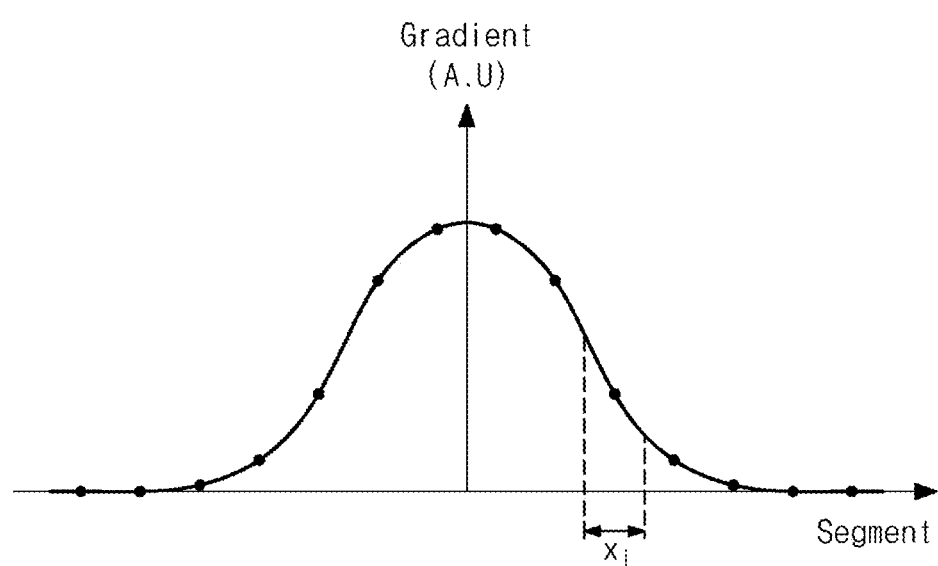
FIG. 4 is a diagram illustrating a gradient calculated from an edge profile.

FIG. 3 is a diagram illustrating an edge profile. FIG. 4 is a diagram illustrating a gradient calculated from an edge profile. The gradient of an edge profile may be calculated by calculating a difference value between brightness values of adjacent pixels in the edge profile. The location of an edge may be predicted according to Equation 1 below.

$$l = \frac{\sum_{i=1}^{n-1} w_i x_i}{\sum_{i=1}^{n-1} w_i}$$ [Equation 1]

$x_i$ is the coordinate of the middle of an i-th segment in the edge profile, $w_i$ is the weight assigned to the i-th segment in the edge profile, and n is the number of pixels in the edge profile. The weight $w_i$ assigned to the i-th segment of the edge profile may be represented by Equation 2 below using a gradient $g_i$ corresponding to the i-th segment and a power factor p of the edge profile.

$$w_i = q_i^p$$ [Equation 2]

In an embodiment of the present invention, an error propagation method is used to find an optimal power factor p value to be applied to all segments within each edge profile. This is a process of finding an optimal power factor which generates minimum errors after error propagation. In order to determine the optimal power factor by the error propagation, first, as shown in Equation 3 below, a weighting vector w including weight components $w_1, w_2, \ldots, w_{n-1}$, for each segment of an edge profile is generated S12.

$$w = [w_1 \, w_2 \, \ldots \, w_{n-1}]^T$$ [Equation 3]

In addition, a vector x containing components of coordinate values $x_1, x_2, \ldots,$ and $x_{n-1}$ of the middle locations of segments in the edge profile is defined as in Equation 4 below.

$$x = [x_1 \, x_2 \, \ldots \, x_{n-1}]^T$$ [Equation 4]

From Equation 1, Equation 3, and Equation 4, a vector containing components of partial derivative values of an edge location l with respect to the weighting vector w is derived as shown in Equation 5 below S13.

$$\frac{\partial l}{\partial w} = \frac{x}{\sum_{i=1}^{n-1} w_i} - \frac{\sum_{i=1}^{n-1} w_i x_i}{\left(\sum_{i=1}^{n-1} w_i\right)^2}$$ [Equation 5]

In Equation 5, x is a vector representing coordinate values of the middle of edge profile, $x_i$ is the coordinate value of the middle of the i-th segment of the edge profile, and $w_i$ is a weight value of the i-th segment of the weighting vector. The amount of errors in the pixel brightness in the edge profile may be represented by a dispersion D{y} of a pixel value y.

Assuming that the error in the pixel value y is independent of each other, D{y} is modeled as in Equation 6 below.

$$D\{y\} = \sigma_y^2 \cdot I_n$$ [Equation 6]

$\sigma_y$ is a standard deviation of an error supposed to be present in each brightness value, and $I_n$ is an identity matrix. A gradient is calculated by determining a difference value between consecutive brightness values. A dispersion D(g) of the gradient affected by an error in a brightness value may be modeled as in Equation 7 below S15.

$$D\{g\} = B \cdot \sigma_y^2 \cdot I_n B^T = \sigma_y^2 B B^T$$ [Equation 7]

$$B_{(n-1) \times n} = \begin{bmatrix} -1 & 1 & 0 & \ldots & 0 \\ 0 & -1 & 1 & \ldots & 0 \\ \vdots & \vdots & \vdots & \ddots & 0 \\ 0 & 0 & \ldots & -1 & 1 \end{bmatrix}$$

In Equation 7, $\sigma_y$ is a standard deviation of an error in a brightness value, and n is the number of segments of the edge profile. For fining an optimal power factor of a gradient, a function y(x) as shown in Equation 8 is employed using an Erf function to model the edge profile.

$$y(x) = \frac{1}{2}\left(\text{erf}\left(\frac{x-l}{\sqrt{2}\,\sigma}\right) + 1\right)$$ [Equation 8]

In Equation 8, x is the coordinate of the middle of each segment in the edge profile, l is an edge location, and σ is a blur value of the edge profile. An edge model as shown in Equation 8 has a contrast value of 1.0 and a dark side brightness value is 0.0. For an edge model having an edge parameter of the edge location l and the blur value σ, a gradient vector g having gradient components $g_1, g_2, \ldots,$ and $g_{n-1}$ for the given each segment of the edge profile is calculated as shown in Equation 9 below.

$$g = [g_1 \, g_2 \, \ldots \, g_{n-1}]^T$$

$$g_i = y_{i+1} - y_i, \, i = 1, 2, \ldots, n-1$$ [Equation 9]

A gradient component $g_i$ of the i-th segment may be calculated by subtracting the brightness value of the i-th pixel from the brightness value of an (i+1)-th pixel of the edge profile. Next, the weight of each edge segment for a given edge location and a blur parameter in the edge profile is calculated by Equation 2 above. Next, the influence of an error in a brightness value on a weight value is calculated. First, as shown in Equation 10 below, the partial derivative of the weighting vector (w of Equation 3) with respect to a gradient vector (g of Equation 9) is calculated S14.

$$\frac{\partial w}{\partial g} = \text{diag}(p \cdot g^{p-1})$$ [Equation 10]

In Equation 10, p is a power factor. Next, using Equation 7 and Equation 10, the dispersion of a weight with respect to the dispersion of an error in a brightness value of the edge profile is calculated as shown in Expression 11.

$$D\{w\} = \frac{\partial w}{\partial g} \times D\{g\} \times \left[\frac{\partial w}{\partial g}\right]^T$$ [Equation 11]

Using Equation 5, Equation 7, and Equation 11, the influence of an error in a brightness value on the dispersion of the edge location is calculated as shown in Equation 12 below.

$$D\{l\} = \frac{\partial l}{\partial w} \times \frac{\partial w}{\partial g} \times D\{g\} \times \left[\frac{\partial w}{\partial g}\right]^T \times \left[\frac{\partial l}{\partial w}\right]^T \quad \text{[Equation 12]}$$

In order to calculate the accuracy of an edge location estimated using Equation 1, a bias factor is added to the dispersion of Equation 12 to calculate an estimated mean squared error (MSE) as shown in Equation 13 below S16.

$$\text{MSE}\{l\} = D\{l\} + (1 - h^{true})^2 \quad \text{[Equation 13]}$$

According to Equation 5, Equation 7, Equation 10, Equation 12, and Equation 13, the propagation of an error (error propagation) MSE{l} may be calculated based on the dispersion D{l} of the edge location which is calculated based on the dispersion of the gradient (diffusion) D{g} (Equation 7), the partial derivative of the edge location l for the weight W (Equation 5), the partial derivative for the gradient g of the weight W (Equation 10), and based on the difference value $l - l^{true}$ between the estimate edge location l and a true edge location l true (Equation 13).

When the propagation of the error MSE{l} is obtained, an optimal power factor for each edge profile is found for a given kernel size and blur value. In Equation 8, the edge profile may be generated to have an arbitrary kernel size, an arbitrary blur factor, and an arbitrary edge location. In one embodiment, the kernel size is set to range from 3 to 40 pixels with an interval of 1 pixel, the blur factor is set range from 0.3 to 10.0 pixels with an interval of 0.05, and the edge location is set to range from −0.5 to 0.5 pixels with an interval of 0.1 pixels.

In an embodiment, in order to estimate the edge location for each edge profile generated by the kernel size, the blur factor, and the edge location, a power factor ranging from 1.0 to 2.0 with an interval of 0.05 may be applied. An MSE value of an edge location is calculated according to Equation 13 above. In one embodiment, the standard deviation of a random error for a brightness value ($\sigma_y$ of Equation 7 above) may be set to 40/255. The maximum value of all MSE values generated by various edge locations according to any power factor is assigned to the maximum MSE value for the power factor. Next, among all power factors, a power factor generating the minimum MSE value among MSE values determined for all edge locations assigned to the power factors is selected as an optimal power factor for the given kernel size and blur value S17.

Figure 6:
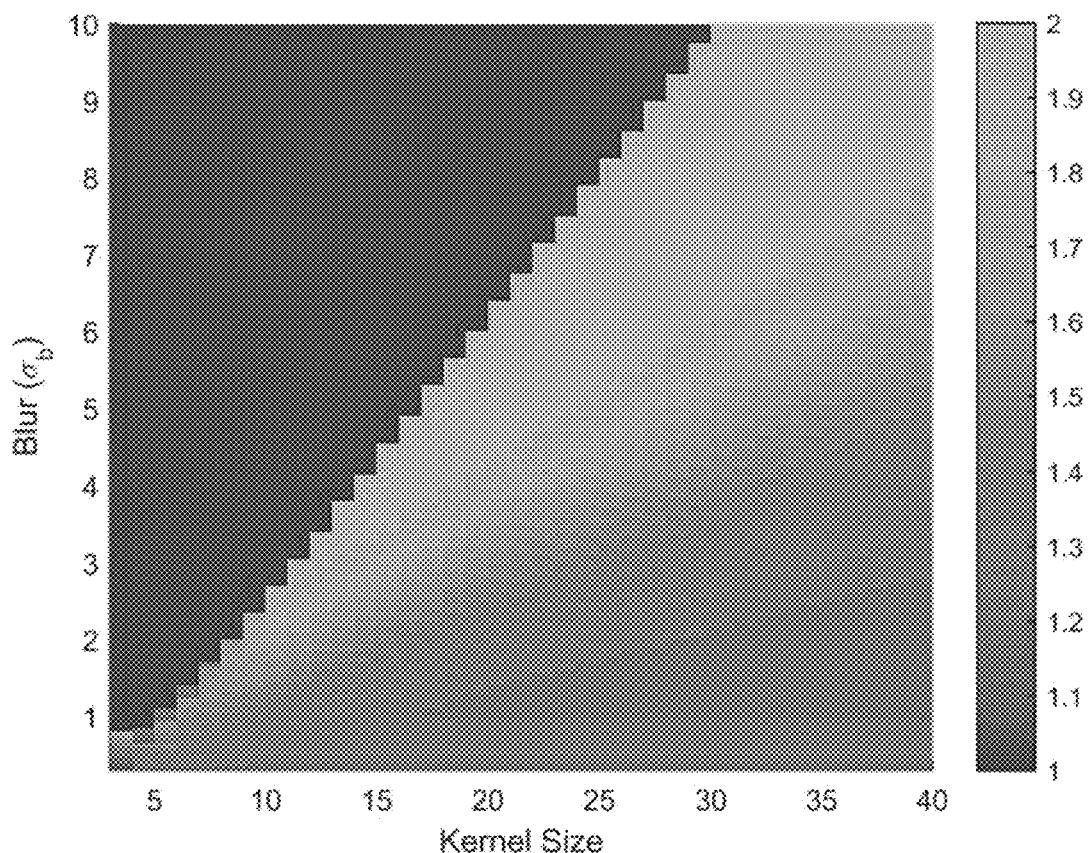
FIG. 6 is a diagram showing the distribution of optimal power factors obtained according to an embodiment of the present invention.

FIG. 6 is a diagram showing the distribution of optimal power factors obtained according to an embodiment of the present invention. Referring to FIG. 6, when a blur value is given, as a kernel size increases, an optimal power factor for a gradient of the edge profile decreases. This means that for higher accuracy, as the kernel size increases, more pixels having a power factor close to 1.0 are included in the edge profile than in the case of a smaller kernel size. In addition, when a kernel size is given, an optimal power factor increases as a blur value increases to 2.0. This shows that as the blur of an edge increases, the maximum accuracy may be obtained using a power factor close to 2.0 when calculating an edge location.

Using the reference diagram illustrated in FIG. 6, an optimal multiplier to be applied to the edge profile may be obtained. When using a bilinear interpolation process which uses adjacent grid points for a kernel size and a blur plane, an optimal power factor for any blur may be calculated. However, the above method may be a factor for delaying the estimation time of an edge location. The problem may be solved by considering that in each edge profile, an edge width is related to a blur value.

Figure 5:
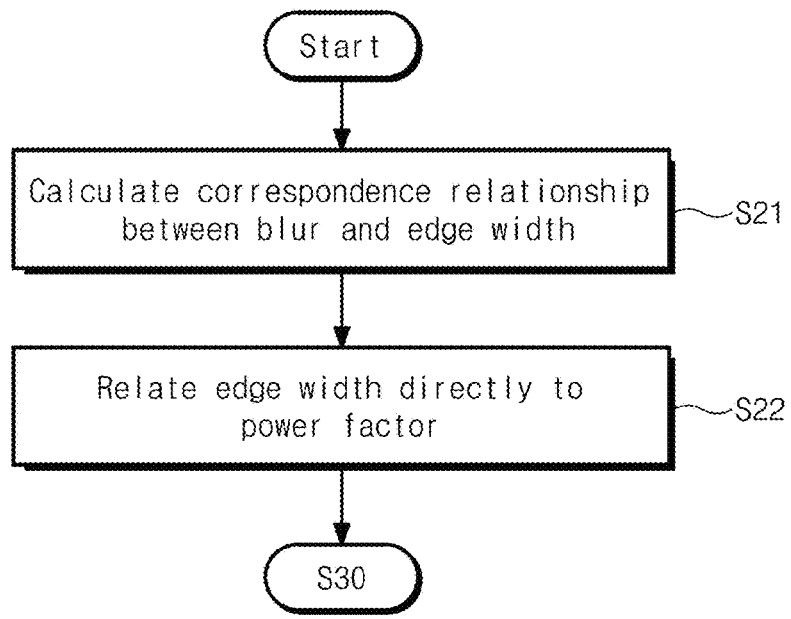
FIG. 5 is a flow chart of Step S20 of FIG. 1.

Referring back to FIG. 1, in order to perform a calculation for estimating an edge location at a high speed, a step of relating the edge width of the edge profile directly to the optimal power factor of the gradient is performed S20. FIG. 5 is a flow chart of Step S20 of FIG. 1. In order to relate an edge width directly to a power factor, the edge width of the edge profile is calculated when a blur value of the edge profile is given.

Figure 7:
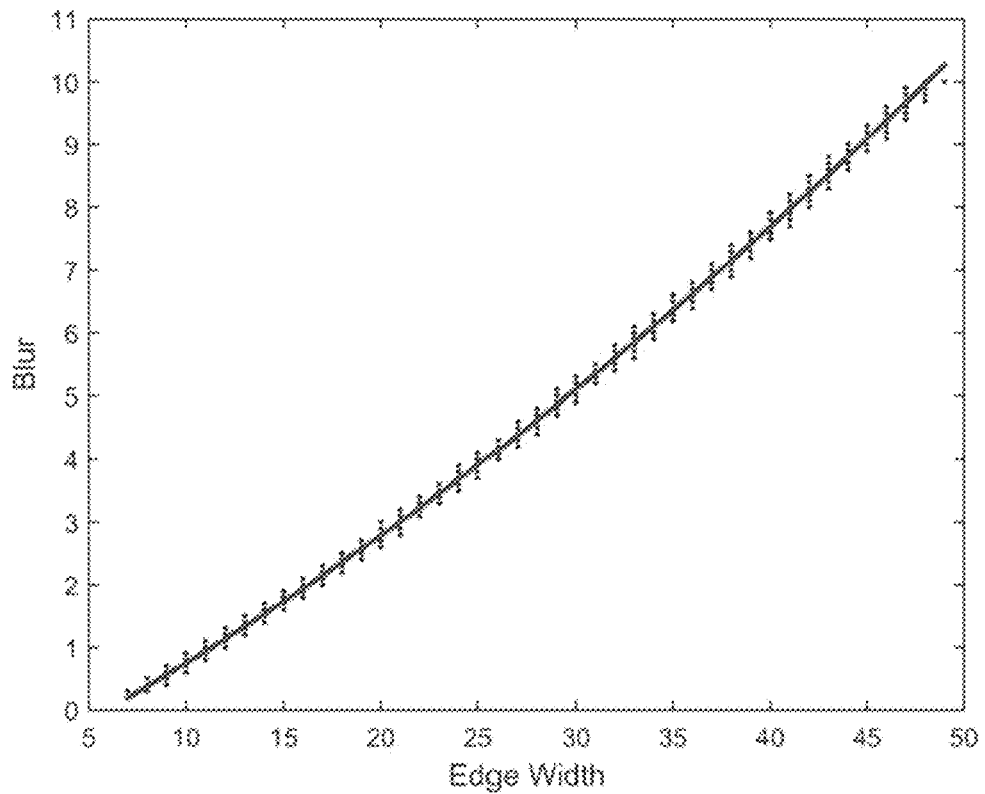
FIG. 7 is a graph illustrating a correspondence relationship between an edge width and a blur value.

FIG. 7 is a graph illustrating a correspondence relationship between an edge width and a blur value. Referring to FIG. 7, the relationship between the edge width of the edge profile and the blur value is obtained in the form of a curve parameter using a least-squares method. In an embodiment, the edge width of the edge profile may be calculated by determining the left and right boundaries of the edge profile, for each edge profile generated by the edge location and the blur value.

As an example, by determining the difference between consecutive brightness values in an edge profile, a profile including a gradient of a brightness value is calculated, and proceeding from the middle of the edge profile toward the left to identify the gradient of each edge profile segment, the left boundary of the edge profile may be determined. The above process may be stopped when the gradient of an edge profile segment is less than 1/255. With a similar process, the right boundary thereof is determined.

Next, in order to capture the shape of the edge profile in its complete shape, the left and right boundaries are extended by two additional pixels toward left and right directions respectively from each boundary segment. Lastly, by counting the number of pixels within the expanded boundaries, the edge width of each edge profile for a given edge location and blur value is calculated.

As illustrated in FIG. 7, it can be seen that an edge width of an edge profile has a close relationship with a blur value. The correspondence relationship between a blur of the edge profile and the edge width may be calculated by a least squares method S21. Corresponding points of the edge width and the blur value may be approximated by a quadratic (second-order) polynomial by the least squares method as shown in Equation 14 below.

$$b_i = aw_i^2 + bw_i + c + \varepsilon_i \quad \text{[Equation 14]}$$

$w_i$ is the edge width of the i-th edge profile, $b_i$ is the blur value of the i-th edge profile, a, b and c are curve parameters to be estimated, and $\varepsilon_i$ is a random error that is assumed to be exist in an i-th blur value. In the example of FIG. 7, a, b, and c are 0.0014, 0.1625, and −1.0131, respectively. A quadratic polynomial having the above coefficient values is illustrated in FIG. 7. FIG. 7 shows that the quadratic polynomial is a good representation of the relationship between the edge width and the blur value.

Using the reference diagram illustrated in FIG. 6 and the curve parameters of FIG. 7, a direct relationship between an edge width and an optimal power factor may be derived S22. First, for a given edge width, a corresponding blur value is calculated using a quadratic polynomial having estimated coefficients. Next, a coordinate point composed of the given edge width and the calculated blur value are identified in the reference diagram. In the diagram, the edge width is considered to correspond to a kernel size within the look-up table. Next, an optimal power at an empty point (in the vicinity of the point) is calculated by bi-linear interpolation using four grid points.

Figure 8:
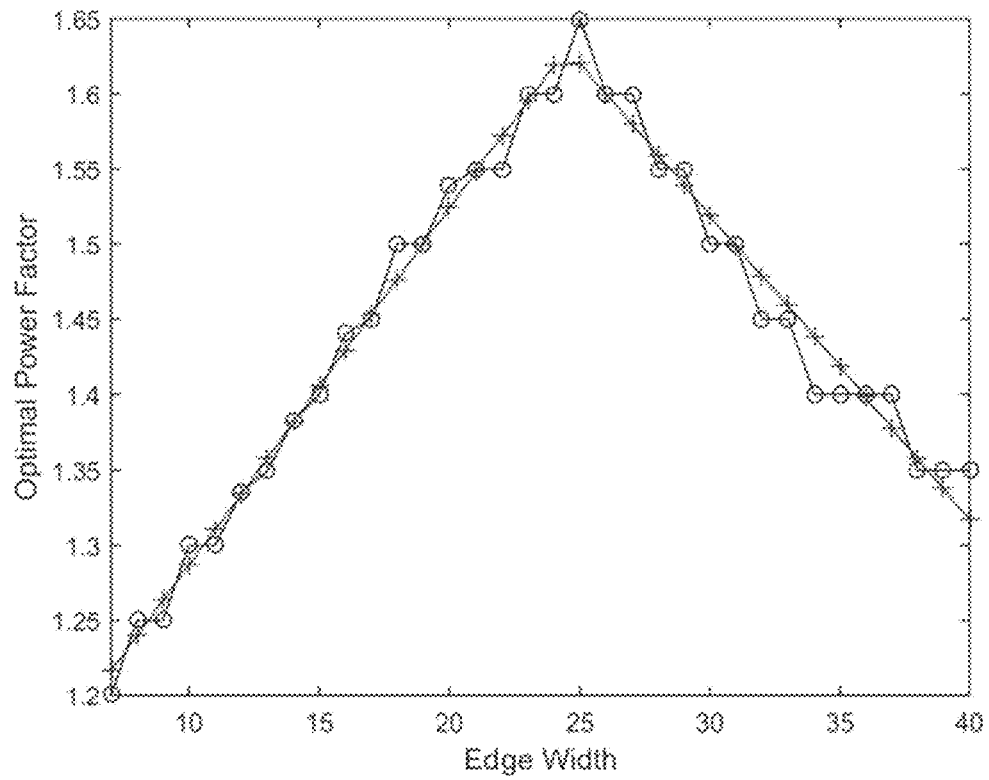
FIG. 8 is a diagram illustrating the result of relating an edge width directly to a multiplier according to an embodiment of the present invention.

FIG. 8 is a diagram illustrating the result of relating an edge width directly to a multiplier according to an embodiment of the present invention. Referring to FIG. 8, when the edge width is smaller than 25 pixels, the optimal power factor increases as the edge width increases. However, when the edge width is larger than 25 pixels, the optimal power factor decreases as the edge width increases. Although there are slight deviations, data points have a clear trend. Because of the above, the trend between the edge width and the power factor may be reduced to two straight lines.

Referring back to FIG. 1 again, using the lines of FIG. 8 representing the trend between an edge width and a power factor, an optimal power factor for the edge width of the edge profile may be calculated S30. Optimal power factors corresponding to edge widths are stored in an array and may be used for determining the edge location of a sub-pixel. Based on the correspondence relationship between a set edge width and a power factor, a power factor to be applied to a gradient of an edge profile for determining an edge location according to the edge width of the edge profile in an image for which the edge location is to be measured is determined. To reduce the effect of noise, a smoothing operation may be applied before determining the edge location of a sub-pixel. After the image smoothing processing, the brightness value in each edge profile in the image may be set to a range of 0.0 to 1.0.

A gradient is generated by calculating a difference value between values adjacent pixels in the edge profile and a power factor determined according to the edge width based on the correspondence relationship between the set kernel size, the edge width, and the power factor may be applied to the gradient to determine the edge location according to Equation 1 above. S40.

Figure 9:
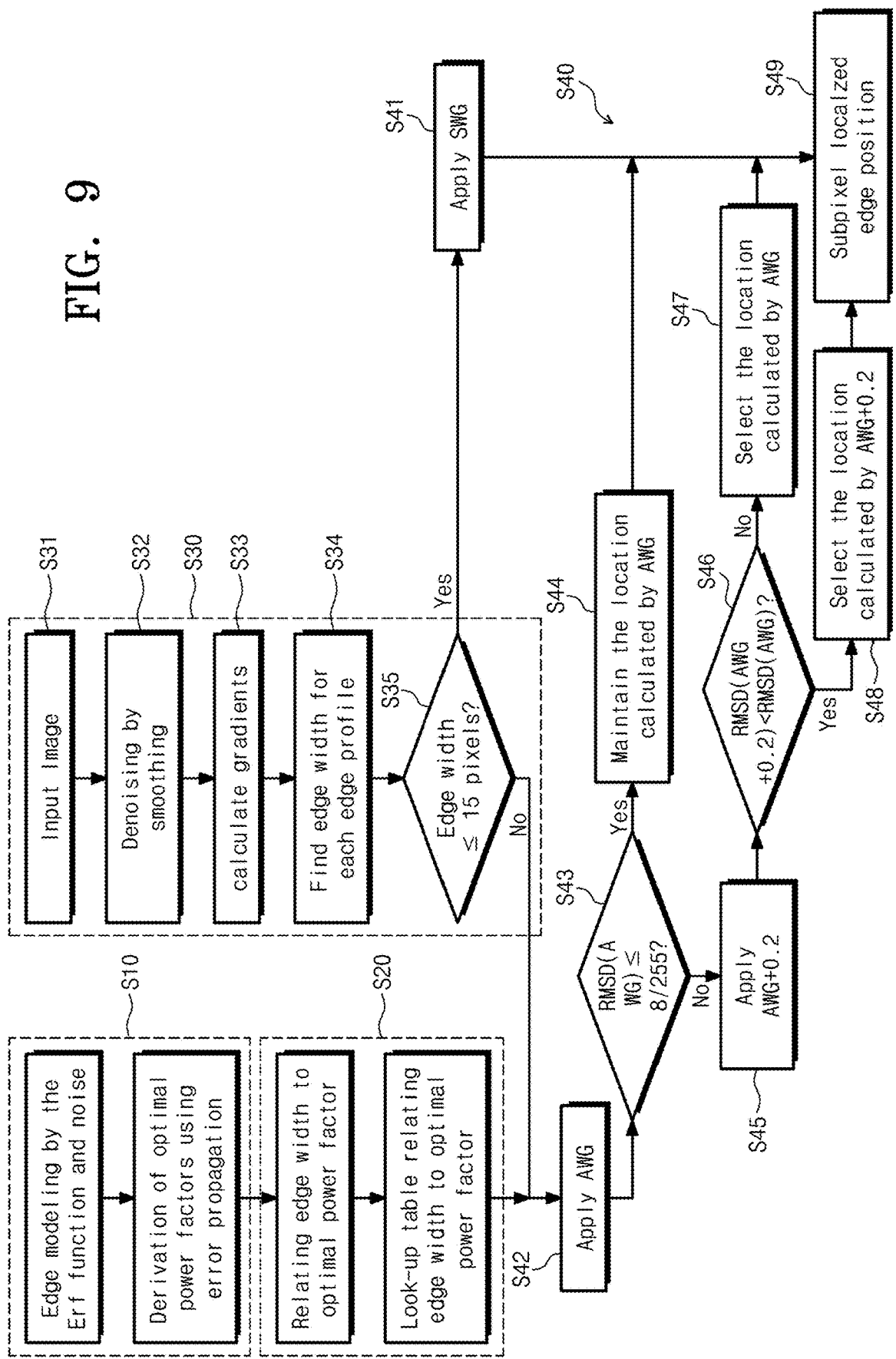
FIG. 9 is a flow chart of a method for determining an edge location according to another embodiment of the present invention.

FIG. 9 is a flow chart of a method for determining an edge location according to another embodiment of the present invention. Referring to FIG. 9, a method for determining an edge location according to an embodiment of the present invention may selectively apply, in order to increase the accuracy of the determination of an edge location according to the degree of a blur of an edge profile, the adaptive weighting of gradients S42 of a gradient or the squared weighting of gradients S41 of a gradient according to the blur value of the edge profile to determine the edge location.

First, in order to calculate the correspondence relationship between an edge width and a power factor of the gradient by relating the edge width of edge profiles with the power factor, edge modeling is performed with various edge widths, various edge locations, and various kernel sizes by an Erf function and noise, and optimal power factors of gradients of the gradient (the difference value between values of adjacent pixels in the edge profile) are derived based on error propagation S10.

Thereafter, based on the error propagation, the edge width of the edge profile and the power factor are directly related to each other to calculate the correspondence relationship (the look up table) between the edge width and the power factor S20. At this time, a power factor generating the minimum MSE value among MSE values determined for all edge locations assigned to power factors may be selected as an optimal power factor for a given kernel size and a blur value corresponding to the edge width.

Thereafter, based on the correspondence relationship between a set edge width and a power factor, a power factor to be applied to a gradient of an edge profile for determining an edge location according to the edge width of the edge profile in an image for which the edge location is to be measured is determined S30. First, in order to reduce the influence of noise, the noise of an input image is removed by a smoothing operation before determining an edge location S31 and S32, the difference value between values of adjacent pixels in the edge profile in the image is calculated after the image smoothing processing to calculate a gradient S33, the edge width of each edge profile is calculated S34, and whether the calculated edge with exceeds a reference number of pixels (15 pixels in the example of FIG. 9) is determined S35.

In the step S35, when the blur value of the edge profile is small (the edge width is equal to or less than the reference number of pixels), a power factor to be applied to the gradient is determined with squared weighting to determine the edge location based on the squared weighting of gradients (SWG), and when the blur value of the edge profile is large (the edge width exceeds the reference number of pixels), the edge location is determined based on the adaptive weighting of gradients (AWG) S42 to S49.

When the edge width of the edge profile exceeds the reference number of pixels, an optimal power factor corresponding to the edge width is determined based on the look-up table, the determined optimal power factor is applied as a power factor of a gradient to primarily determine an edge location, and whether the root mean squares of the differences (RMSD) of an edge calculated based on the adaptive weighting of gradients (AWG) is less than or equal to a reference value (8/255 in the example of FIG. 9) is determined S24 and S43.

In the step S43, when the root mean squares of the differences (RMSD) of the edge is less than the reference value, the edge location calculated based on the adaptive weighting of gradients in the step S42 is finally selected S44 and S49, and when the root mean squares of the differences (RMSD) of the edge exceeds the reference value, a correction value (0.2 in the example of FIG. 9) set to the optimal power factor calculated based on the look up table is additionally applied to apply a power factor obtained by adding the correction value to the optimal power factor to the gradient S45. Then, the root mean squares of the differences (RMSD) (AWG+0.2) of the edge is re-calculated by applying a power factor corrected by applying the correction value (the power factor obtained by adding a correction value 0.2 to the initial AWG power factor in the example of FIG. 9) to the gradient, and the re-calculated root mean squares of the differences is compared with the root mean squares of the differences (RMSD) (AWG) of the edge calculated before the power factor correction S46.

In the step S46, when the root mean squares of the differences of the edge after the power factor correction is not smaller than that before the power factor correction, the edge location calculated based on the power factor before the correction is finally selected S47 and S49), and when the root mean squares of the differences of the edge after the power factor correction is smaller than that before the power factor correction, the edge location calculated based on the corrected power factor is finally selected S48 and S49. Therefore, through the series of processes of the step S40, based on the edge width of the edge profile and the root mean squares of the differences of the edge calculated according to the adaptive weighting of gradients of the gradient, an optimal power factor of the gradient may be applied to determine the location of the edge accurately.

In order to verify the performance of the method for determining an edge location according to the embodiment of the present invention, a test was performed under various conditions using a virtually generated image. To this end, virtual images having various blur values, various noise levels, and various edge locations were generated. Blur values $\sigma_b$ of the images were generated to be 0.40, 0.75, 1.00, 1.25, 1.50, 1.75, 2.00, and 2.25.

Noise levels r of brightness values of the images were classified into two groups. The first group has noise levels of 2/255, 4/255, 6/255, and 8/255, and the second group has noise levels of 10/255, 20/255, 30/255, and 40/255. Edge locations of the images were varied by a 0.1 pixel interval in the range of −0.5 to 0.5 pixels. The number of edge profiles included in each image was set to 1000. In each image, edge profiles were generated using Equation 8 above. Various noises were randomly generated based on the normal distribution of Matlab and added to the edge profiles. Lastly, using an edge profile added with a random noise, the performance of the method for determining an edge location according to an embodiment of the present invention was compared with typical methods.

An edge location at which the maximum RMSE was observed for a simulated edge was calculated for the average and maximum values of the root mean squared errors (RMSE) and the true edge location set in the range of −0.5 to 0.5 pixels, and the results are summarized in Table 1 and Table 2.

TABLE 1

| Test | $\sigma_b$ | $\sigma_y$ | SM $r_{mean}$ | SM $r_{max}$ | SM $L_{max}$ | GM $r_{mean}$ | GM $r_{max}$ | GM $L_{max}$ | EF $r_{mean}$ | EF $r_{max}$ | EF $L_{max}$ | SWG $r_{mean}$ | SWG $r_{max}$ | SWG $L_{max}$ | AWG Mean | AWG Max | AWG $L_{max}$ |
|---|---|---|---|---|---|---|---|---|---|---|---|---|---|---|---|---|---|
| 1 | 0.40 | 2/255 | 1.24 | 1.09 | 0.4 | 0.98 | 0.96 | 0.3 | 1.01 | 1.02 | 0.3 | 1.24 | 1.31 | 0.2 | 0.0146 | 0.0211 | 0.3 |
| 2 |  | 4/255 | 1.93 | 1.69 | 0.3 | 1.09 | 1.06 | −0.3 | 1.01 | 1.01 | 0.2 | 1.11 | 1.22 | 0.2 | 0.0197 | 0.0248 | −0.2 |
| 3 |  | 6/255 | 2.07 | 1.84 | 0.2 | 1.11 | 1.09 | 0.3 | 1.01 | 1.03 | 0.3 | 1.02 | 1.13 | −0.2 | 0.0263 | 0.0318 | 0.3 |
| 4 |  | 8/255 | 2.17 | 2.00 | 0.0 | 1.11 | 1.09 | 0.2 | 1.00 | 1.02 | 0.2 | 0.97 | 1.06 | 0.2 | 0.0324 | 0.0369 | 0.2 |
| 5 | 0.75 | 2/255 | 2.52 | 2.87 | −0.2 | 1.21 | 1.26 | −0.1 | 1.03 | 1.03 | −0.1 | 0.99 | 0.97 | 0.2 | 0.0084 | 0.0089 | −0.1 |
| 6 |  | 4/255 | 2.56 | 2.63 | −0.2 | 1.19 | 1.20 | 0.2 | 1.02 | 1.03 | 0.2 | 0.98 | 1.00 | 0.5 | 0.0167 | 0.0171 | 0.2 |
| 7 |  | 6/255 | 2.49 | 2.51 | −0.5 | 1.17 | 1.15 | −0.4 | 1.03 | 1.03 | −0.2 | 0.97 | 0.99 | 0.2 | 0.0247 | 0.0261 | −0.2 |
| 8 |  | 8/255 | 2.32 | 2.40 | 0.5 | 1.13 | 1.15 | 0.5 | 1.02 | 1.02 | 0.1 | 0.95 | 0.99 | 0.2 | 0.0338 | 0.0343 | 0.1 |
| 9 | 1.00 | 2/255 | 2.65 | 2.76 | 0.2 | 1.23 | 1.23 | 0.2 | 1.02 | 1.02 | −0.4 | 1.03 | 1.04 | 0.1 | 0.0094 | 0.0099 | 0.1 |
| 10 |  | 4/255 | 2.55 | 2.79 | −0.1 | 1.20 | 1.24 | −0.1 | 1.03 | 1.02 | −0.5 | 1.01 | 1.02 | −0.5 | 0.0189 | 0.0199 | −0.5 |
| 11 |  | 6/255 | 2.38 | 2.46 | −0.1 | 1.16 | 1.16 | −0.1 | 1.03 | 1.02 | −0.1 | 1.01 | 1.03 | −0.1 | 0.0289 | 0.0319 | −0.1 |
| 12 |  | 8/255 | 2.26 | 2.35 | −0.1 | 1.13 | 1.15 | −0.1 | 1.02 | 1.04 | 0.0 | 1.00 | 1.03 | −0.5 | 0.0378 | 0.0395 | 0.0 |
| 13 | 1.25 | 2/255 | 2.86 | 3.11 | −0.5 | 1.30 | 1.34 | −0.5 | 1.02 | 1.02 | −0.4 | 1.06 | 1.06 | 0.0 | 0.0105 | 0.0110 | 0.0 |
| 14 |  | 4/255 | 2.63 | 2.57 | 0.5 | 1.23 | 1.23 | −0.3 | 1.03 | 1.03 | −0.3 | 1.06 | 1.02 | 0.2 | 0.0211 | 0.0232 | −0.3 |
| 15 |  | 6/255 | 2.43 | 2.37 | −0.2 | 1.17 | 1.17 | 0.5 | 1.03 | 1.02 | 0.5 | 1.06 | 1.06 | 0.5 | 0.0314 | 0.0339 | 0.5 |
| 16 |  | 8/255 | 2.24 | 2.18 | 0.4 | 1.14 | 1.14 | 0.4 | 1.02 | 1.04 | 0.4 | 1.05 | 1.01 | 0.4 | 0.0427 | 0.0460 | 0.4 |
| 17 | 1.50 | 2/255 | 2.94 | 3.17 | −0.2 | 1.31 | 1.40 | −0.2 | 1.01 | 1.02 | −0.2 | 1.10 | 1.10 | −0.4 | 0.0117 | 0.0122 | 0.5 |
| 18 |  | 4/255 | 2.62 | 2.76 | −0.1 | 1.23 | 1.25 | −0.1 | 1.02 | 1.03 | 0.1 | 1.09 | 1.11 | 0.1 | 0.0235 | 0.0242 | 0.1 |
| 19 |  | 6/255 | 2.41 | 2.42 | −0.1 | 1.17 | 1.17 | −0.1 | 1.02 | 1.02 | −0.4 | 1.10 | 1.13 | 0.2 | 0.0354 | 0.0371 | −0.3 |
| 20 |  | 8/255 | 2.22 | 2.22 | −0.5 | 1.15 | 1.12 | −0.3 | 1.02 | 1.00 | −0.3 | 1.08 | 1.10 | 0.2 | 0.0474 | 0.0504 | 0.2 |
| 21 | 1.75 | 2/255 | 3.08 | 3.25 | −0.5 | 1.36 | 1.37 | 0.4 | 1.01 | 1.00 | −0.2 | 1.12 | 1.13 | −0.2 | 0.0130 | 0.0139 | −0.2 |
| 22 |  | 4/255 | 2.74 | 2.80 | −0.5 | 1.26 | 1.30 | −0.5 | 1.01 | 1.01 | −0.4 | 1.11 | 1.10 | −0.4 | 0.0257 | 0.0272 | −0.4 |
| 23 |  | 6/255 | 2.46 | 2.40 | −0.4 | 1.18 | 1.15 | 0.5 | 1.01 | 1.01 | 0.3 | 1.10 | 1.08 | 0.0 | 0.0392 | 0.0417 | 0.3 |
| 24 |  | 8/255 | 2.27 | 2.24 | −0.1 | 1.15 | 1.13 | −0.2 | 1.01 | 1.02 | −0.4 | 1.11 | 1.11 | −0.3 | 0.0517 | 0.0550 | −0.4 |
| 25 | 2.00 | 2/255 | 3.16 | 3.31 | 0.1 | 1.39 | 1.43 | 0.1 | 1.00 | 0.99 | −0.2 | 1.14 | 1.16 | −0.3 | 0.0140 | 0.0145 | −0.3 |
| 26 |  | 4/255 | 2.67 | 2.62 | −0.1 | 1.25 | 1.24 | −0.1 | 1.01 | 1.00 | −0.3 | 1.13 | 1.15 | 0.1 | 0.0286 | 0.0303 | 0.5 |
| 27 |  | 6/255 | 2.41 | 2.38 | 0.2 | 1.19 | 1.18 | 0.2 | 1.01 | 1.00 | −0.3 | 1.12 | 1.20 | −0.5 | 0.0431 | 0.0452 | −0.5 |
| 28 |  | 8/255 | 2.27 | 2.32 | −0.3 | 1.16 | 1.17 | −0.4 | 1.01 | 1.01 | 0.4 | 1.12 | 1.12 | −0.1 | 0.0565 | 0.0589 | 0.2 |
| 29 | 2.25 | 2/255 | 3.31 | 3.23 | −0.5 | 1.46 | 1.43 | 0.5 | 1.00 | 1.00 | 0.5 | 1.14 | 1.12 | 0.5 | 0.0152 | 0.0165 | 0.5 |
| 30 |  | 4/255 | 2.82 | 2.89 | −0.2 | 1.30 | 1.32 | −0.2 | 1.00 | 1.01 | 0.2 | 1.13 | 1.12 | 0.2 | 0.0306 | 0.0318 | 0.2 |
| 31 |  | 6/255 | 2.56 | 2.59 | 0.2 | 1.24 | 1.24 | 0.2 | 1.01 | 1.01 | −0.5 | 1.12 | 1.11 | 0.2 | 0.0458 | 0.0484 | −0.5 |
| 32 |  | 8/255 | 2.29 | 2.20 | 0.3 | 1.18 | 1.16 | 0.4 | 1.01 | 1.00 | 0.4 | 1.12 | 1.31 | 0.4 | 0.0610 | 0.0652 | 0.4 |
| Mean |  |  | 2.49 | 2.51 |  | 1.21 | 1.21 |  | 1.02 | 1.02 |  | 1.07 | 1.09 |  |  |  |  |

TABLE 2

| Test | $\sigma_b$ | $\sigma_y$ | SM $r_{mean}$ | SM $r_{max}$ | SM $L_{max}$ | GM $r_{mean}$ | GM $r_{max}$ | GM $L_{max}$ | EF $r_{mean}$ | EF $r_{max}$ | EF $L_{max}$ | SWG $r_{mean}$ | SWG $r_{max}$ | SWG $L_{max}$ | AWG − 0.2 Mean | AWG − 0.2 Max | AWG − 0.2 $L_{max}$ |
|---|---|---|---|---|---|---|---|---|---|---|---|---|---|---|---|---|---|
| 33 | 0.40 | 10/255 | 2.27 | 2.27 | −0.1 | 1.17 | 1.12 | −0.2 | 1.07 | 1.03 | 0.2 | 1.00 | 1.05 | −0.2 | 0.0369 | 0.0405 | −0.2 |
| 34 |  | 20/255 | 2.17 | 2.21 | −0.4 | 1.17 | 1.16 | −0.4 | 1.07 | 1.06 | −0.1 | 0.94 | 0.95 | 0.2 | 0.0698 | 0.0734 | −0.4 |
| 35 |  | 30/255 | 1.94 | 1.91 | 0.2 | 1.13 | 1.11 | 0.3 | 1.05 | 1.05 | 0.3 | 0.90 | 0.91 | 0.3 | 0.1093 | 0.1169 | 0.3 |
| 36 |  | 40/255 | 1.80 | 1.79 | 0.5 | 1.09 | 1.07 | 0.2 | 1.01 | 1.00 | 0.2 | 0.88 | 0.88 | 0.2 | 0.1508 | 0.1604 | −0.1 |
| 37 | 0.75 | 10/255 | 2.35 | 2.41 | 0.5 | 1.17 | 1.16 | 0.5 | 1.06 | 1.07 | −0.1 | 1.01 | 0.99 | 0.2 | 0.0403 | 0.0424 | −0.1 |
| 38 |  | 20/255 | 1.97 | 2.03 | 0.2 | 1.13 | 1.14 | 0.2 | 1.06 | 1.06 | 0.2 | 0.98 | 0.98 | 0.5 | 0.0811 | 0.0842 | 0.2 |
| 39 |  | 30/255 | 1.82 | 1.85 | −0.3 | 1.11 | 1.12 | 0.1 | 1.04 | 1.06 | −0.2 | 0.95 | 0.98 | 0.2 | 0.1238 | 0.1287 | −0.2 |
| 40 |  | 40/255 | 1.66 | 1.69 | 0.3 | 1.07 | 1.07 | 0.3 | 1.01 | 1.00 | 0.3 | 0.93 | 0.94 | 0.2 | 0.1737 | 0.1807 | 0.3 |
| 41 | 1.00 | 10/255 | 2.20 | 2.17 | −0.4 | 1.14 | 1.14 | −0.4 | 1.04 | 1.04 | −0.4 | 1.03 | 1.03 | 0.1 | 0.0462 | 0.0491 | 0.1 |
| 42 |  | 20/255 | 1.92 | 1.90 | −0.4 | 1.12 | 1.14 | −0.5 | 1.05 | 1.07 | −0.5 | 1.00 | 1.00 | −0.5 | 0.0931 | 0.0974 | −0.5 |
| 43 |  | 30/255 | 1.68 | 1.66 | −0.1 | 1.07 | 1.08 | −0.1 | 1.02 | 1.04 | −0.1 | 0.98 | 1.00 | −0.1 | 0.1478 | 0.1612 | −0.1 |
| 44 |  | 40/255 | 1.58 | 1.60 | −0.1 | 1.06 | 1.07 | −0.1 | 1.01 | 1.04 | 0.0 | 0.96 | 0.97 | 0.0 | 0.1977 | 0.2068 | 0.0 |
| 45 | 1.25 | 10/255 | 2.17 | 2.14 | 0.3 | 1.14 | 1.14 | −0.4 | 1.04 | 1.04 | −0.4 | 1.05 | 1.04 | 0.0 | 0.0522 | 0.0547 | 0.0 |
| 46 |  | 20/255 | 1.84 | 1.84 | −0.3 | 1.09 | 1.12 | −0.3 | 1.03 | 1.05 | −0.3 | 1.03 | 1.02 | 0.2 | 0.1061 | 0.1144 | −0.3 |
| 47 |  | 30/255 | 1.64 | 1.64 | −0.2 | 1.07 | 1.07 | −0.2 | 1.02 | 1.02 | −0.2 | 1.01 | 0.99 | 0.5 | 0.1599 | 0.1738 | −0.2 |
| 48 |  | 40/255 | 1.50 | 1.50 | 0.4 | 1.05 | 1.07 | 0.4 | 1.00 | 1.02 | 0.4 | 0.98 | 0.98 | −0.1 | 0.2243 | 0.2376 | 0.4 |
| 49 | 1.50 | 10/255 | 2.12 | 2.22 | −0.2 | 1.12 | 1.14 | −0.2 | 1.01 | 1.02 | 0.5 | 1.07 | 1.07 | −0.4 | 0.0596 | 0.0618 | −0.3 |

TABLE 2-continued

| | | | SM | | | GM | | | EF | | | SWG | | | AWG – 0.2 | | |
|---|---|---|---|---|---|---|---|---|---|---|---|---|---|---|---|---|---|
| Test | $\sigma_b$ | $\sigma_y$ | $r_{mean}$ | $r_{max}$ | $L_{max}$ | $r_{mean}$ | $r_{max}$ | $L_{max}$ | $r_{mean}$ | $r_{max}$ | $L_{max}$ | $r_{mean}$ | $r_{max}$ | $L_{max}$ | Mean | Max | $L_{max}$ |
| 50 | | 20/255 | 1.78 | 1.79 | −0.4 | 1.08 | 1.08 | 0.1 | 1.02 | 1.02 | 0.1 | 1.04 | 1.05 | 0.1 | 0.1194 | 0.1246 | 0.1 |
| 51 | | 30/255 | 1.56 | 1.56 | −0.3 | 1.06 | 1.07 | −0.3 | 1.02 | 1.02 | −0.3 | 1.03 | 1.03 | 0.2 | 0.1814 | 0.1909 | −0.3 |
| 52 | | 40/255 | 1.46 | 1.46 | −0.5 | 1.04 | 1.01 | −0.3 | 1.00 | 0.98 | 0.2 | 1.01 | 1.02 | 0.2 | 0.2483 | 0.2615 | 0.2 |
| 53 | 1.75 | 10/255 | 2.09 | 2.11 | 0.1 | 1.11 | 1.07 | 0.3 | 1.00 | 0.98 | −0.2 | 1.08 | 1.07 | −0.2 | 0.0661 | 0.0720 | −0.2 |
| 54 | | 20/255 | 1.74 | 1.76 | −0.5 | 1.07 | 1.06 | −0.4 | 1.01 | 1.01 | −0.4 | 1.05 | 1.05 | 0.4 | 0.1323 | 0.1388 | −0.4 |
| 55 | | 30/255 | 1.55 | 1.51 | −0.2 | 1.04 | 1.03 | 0.3 | 1.00 | 1.00 | 0.3 | 1.03 | 1.03 | 0.3 | 0.2042 | 0.2194 | 0.3 |
| 56 | | 40/255 | 1.42 | 1.41 | −0.2 | 1.03 | 1.03 | −0.2 | 0.99 | 0.98 | −0.2 | 1.02 | 1.00 | −0.2 | 0.2735 | 0.2965 | −0.2 |
| 57 | 2.00 | 10/255 | 2.06 | 2.01 | 0.5 | 1.10 | 1.08 | 0.4 | 0.99 | 0.96 | −0.3 | 1.08 | 1.08 | −0.3 | 0.0726 | 0.0771 | −0.3 |
| 58 | | 20/255 | 1.66 | 1.64 | −0.2 | 1.05 | 1.06 | −0.1 | 1.00 | 1.01 | −0.3 | 1.06 | 1.06 | −0.3 | 0.1484 | 0.1551 | −0.3 |
| 59 | | 30/255 | 1.46 | 1.44 | 0.2 | 1.03 | 1.03 | −0.3 | 0.99 | 1.00 | −0.3 | 1.04 | 1.07 | −0.5 | 0.2264 | 0.2362 | 0.2 |
| 60 | | 40/255 | 1.40 | 1.37 | −0.3 | 1.02 | 1.02 | 0.2 | 0.99 | 0.98 | 0.2 | 1.03 | 1.02 | 0.2 | 0.3025 | 0.3196 | 0.2 |
| 61 | 2.25 | 10/255 | 2.03 | 2.01 | −0.1 | 1.10 | 1.08 | −0.5 | 0.97 | 0.97 | 0.5 | 1.08 | 1.07 | 0.5 | 0.0798 | 0.0856 | 0.5 |
| 62 | | 20/255 | 1.68 | 1.67 | 0.0 | 1.06 | 1.05 | 0.2 | 1.00 | 0.98 | 0.2 | 1.06 | 1.04 | 0.2 | 0.1597 | 0.1695 | 0.2 |
| 63 | | 30/255 | 1.51 | 1.51 | 0.2 | 1.04 | 1.03 | 0.2 | 0.99 | 0.98 | −0.5 | 1.04 | 1.03 | 0.2 | 0.2432 | 0.2565 | 0.2 |
| 64 | | 40/255 | 1.38 | 1.40 | −0.3 | 1.03 | 1.03 | 0.4 | 0.99 | 0.98 | 0.4 | 1.02 | 1.02 | 0.1 | 0.3324 | 0.3525 | 0.1 |
| | Mean | | 1.79 | 1.80 | | 1.09 | 1.08 | | 1.02 | 1.02 | | 1.01 | 1.01 | | | | |

Among the methods for determining an edge location, 'SM' is the method described in "*IEEE Mans. Pattern Analysis and Machine Intelligence*, vol, 11, no. 12, pp. 1293-1309, 1989, doi:10.1109/34.41367, Subpixel Measurement Using a Moment-Based Edge Operator (E. P. Lyvers, O. R. Mitchell, M. L. Akey, and A. P. Reeves)," 'GM' is the method described in "*IEEE Trans. Pattern Analysis and Machine Intelligence*, vol. PAMI-6, no. 2, pp. 188-201, 1984, doi:10.1109/TPAMI.1984.4767502, Edge Localization to Subpixel Values in Digital Imagery (A. J. Tabatabai and O. R. Mitchell)," 'EF' is the method described in "*Optik*, vol. 125, no. 9, pp. 2076-2080, May 2014, doi:10.1016/ijleo.2013.10.020, Sub-Pixel Dimensional Measurement with Logistic Edge Model (P. Chen, F. Chen, Y. Han, and Z. Zhang)," 'SWG' is the method for determining an edge location based on the squared weighting of gradients, and 'AWG' is the method for determining an edge location based on the adaptive weighting of gradients according to the embodiment of the present invention.

For the comparison of the embodiment (AWG) of the present invention and other methods, the average RMSE (Mean) and the maximum RMSE (MAX) of the AWG are summarized in Table 1 and Table 2, and the average RMSE $r_{mean}$ of SM, GM, EF, and SWG and the maximum RMSE $r_{max}$ are represented as a ratio to AWG In addition, an edge location $L_{max}$ measured by the maximum RMSE in each method are summarized in Tables 1 and 2. In all 32 experiments on low noise levels summarized in Table 1, the accuracy of the method for determining an edge location method according to the embodiment of the present invention is shown to be higher than that of each of other methods. When the average value of the average RMSE ratios of other methods is compared with that of AWG the embodiment of the invention (AWG) is 149% more accurate than SM, 21% more accurate than GM, 2% more accurate than EF, and 7% more accurate than SWG.

In experiments on high noise levels, the embodiment of the present invention (AWG) has a higher accuracy than when an optimal power factor is corrected to be added by 0.2. Table 2 summarizes the results after the power factor correction as described above. When a power factor is corrected as described above, when a distortion occurs in an image profile due to a high noise level, more weight is given to coordinates of edge segments having a relatively high gradient value, so that the distortion problem of the edge profile may be better solved. The results of Experiments 33 to 64 on high noise levels which are summarized in Table 2 show that the embodiment of the present invention (AWG) shows, as in the case of low noise levels, a higher accuracy of the determination of an edge location than that of each of other methods. Of Table 1 and Table 2, when the blur value of the edge profile is 0.75, it can be seen that the accuracy of SWG is higher than that of AWG

TABLE 3

| Test | $\sigma_b$ | $\sigma_y$ | Mean of Kurtoses of Gradient Profiles After Smoothing | Mean of Edge Widths after Smoothing | Mean of Applied Power Factors |
|---|---|---|---|---|---|
| 1 | 0.40 | 2/255 | 3.7413 | 13.74 | 1.3755 |
| 2 | | 4/255 | 4.3883 | 14.32 | 1.3822 |
| 3 | | 6/255 | 4.9221 | 14.23 | 1.3872 |
| 4 | | 8/255 | 5.3599 | 14.35 | 1.3907 |
| 5 | 0.75 | 2/255 | 3.7434 | 14.65 | 1.3979 |
| 6 | | 4/255 | 4.2720 | 14.93 | 1.4039 |
| 7 | | 6/255 | 4.4948 | 15.14 | 1.4087 |
| 8 | | 8/255 | 4.6921 | 15.22 | 1.4107 |
| 9 | 1.00 | 2/255 | 3.3901 | 15.47 | 1.4167 |
| 10 | | 4/255 | 3.8624 | 15.72 | 1.4227 |
| 11 | | 6/255 | 4.2340 | 15.94 | 1.4278 |
| 12 | | 8/255 | 4.3756 | 16.04 | 1.4300 |
| 13 | 1.25 | 2/255 | 3.3701 | 16.47 | 1.4403 |
| 14 | | 4/255 | 3.6416 | 16.67 | 1.4450 |
| 15 | | 6/255 | 3.9264 | 16.81 | 1.4485 |
| 16 | | 8/255 | 4.0484 | 16.91 | 1.4509 |
| 17 | 1.50 | 2/255 | 3.2583 | 17.44 | 1.4633 |
| 18 | | 4/255 | 3.5727 | 17.68 | 1.4690 |
| 19 | | 6/255 | 3.7639 | 17.84 | 1.4729 |
| 20 | | 8/255 | 3.8513 | 17.84 | 1.4728 |
| 21 | 1.75 | 2/255 | 3.2178 | 18.52 | 1.4890 |
| 22 | | 4/255 | 3.4176 | 18.74 | 1.4942 |
| 23 | | 6/255 | 3.6123 | 18.86 | 1.4970 |
| 24 | | 8/255 | 3.7224 | 18.84 | 1.4965 |
| 25 | 2.00 | 2/255 | 3.1608 | 19.56 | 1.5137 |
| 26 | | 4/255 | 3.3068 | 19.76 | 1.5184 |
| 27 | | 6/255 | 3.4451 | 19.80 | 1.5192 |
| 28 | | 8/255 | 3.6072 | 19.81 | 1.5195 |
| 29 | 2.25 | 2/255 | 3.1098 | 20.65 | 1.5395 |
| 30 | | 4/255 | 3.2253 | 20.82 | 1.5436 |
| 31 | | 6/255 | 3.3831 | 20.86 | 1.5442 |
| 32 | | 8/255 | 3.4780 | 20.79 | 1.5423 |

TABLE 4

| Test | $\sigma_b$ | $\sigma_y$ | Mean of Kurtoses of Gradient Profiles After Smoothing | Mean of Edge Widths after Smoothing | Mean of Applied Power Factors |
|---|---|---|---|---|---|
| 33 | 0.40 | 10/255 | 5.7280 | 14.41 | 1.5915 |
| 34 |  | 20/255 | 6.0918 | 14.57 | 1.5952 |
| 35 |  | 30/255 | 5.7556 | 14.44 | 1.5922 |
| 36 |  | 40/255 | 5.4489 | 14.31 | 1.5891 |
| 37 | 0.75 | 10/255 | 4.9554 | 15.27 | 1.6118 |
| 38 |  | 20/255 | 5.2936 | 15.26 | 1.6117 |
| 39 |  | 30/255 | 5.0024 | 15.17 | 1.6094 |
| 40 |  | 40/255 | 4.8175 | 14.96 | 1.6045 |
| 41 | 1.00 | 10/255 | 4.5134 | 16.07 | 1.6309 |
| 42 |  | 20/255 | 4.7166 | 15.95 | 1.6280 |
| 43 |  | 30/255 | 4.7134 | 15.77 | 1.6238 |
| 44 |  | 40/255 | 4.4519 | 15.59 | 1.6195 |
| 45 | 1.25 | 10/255 | 4.1852 | 16.92 | 1.6509 |
| 46 |  | 20/255 | 4.4062 | 16.74 | 1.6467 |
| 47 |  | 30/255 | 4.3373 | 16.44 | 1.6396 |
| 48 |  | 40/255 | 4.0725 | 16.18 | 1.6335 |
| 49 | 1.50 | 10/255 | 3.9454 | 17.85 | 1.6731 |
| 50 |  | 20/255 | 4.1797 | 17.61 | 1.6672 |
| 51 |  | 30/255 | 4.0127 | 17.22 | 1.6580 |
| 52 |  | 40/255 | 3.8535 | 16.88 | 1.6501 |
| 53 | 1.75 | 10/255 | 3.8081 | 18.82 | 1.6961 |
| 54 |  | 20/255 | 3.8641 | 18.42 | 1.6865 |
| 55 |  | 30/255 | 3.7659 | 18.00 | 1.6765 |
| 56 |  | 40/255 | 3.6286 | 17.53 | 1.6652 |
| 57 | 2.00 | 10/255 | 3.6611 | 19.73 | 1.7176 |
| 58 |  | 20/255 | 3.6392 | 19.23 | 1.7054 |
| 59 |  | 30/255 | 3.5976 | 18.71 | 1.6931 |
| 60 |  | 40/255 | 3.4303 | 18.23 | 1.6817 |
| 61 | 2.25 | 10/255 | 3.4718 | 20.70 | 1.7399 |
| 62 |  | 20/255 | 3.4496 | 20.04 | 1.7239 |
| 63 |  | 30/255 | 3.3527 | 19.38 | 1.7086 |
| 64 |  | 40/255 | 3.2820 | 18.77 | 1.6943 |

Tables 3 and 4 summarize the mean of edge widths of the edge profiles and the mean of applied power factors to the gradients used in the experiments of Table 1 and Table 2 for the embodiment of the present invention (AWG). As illustrated in Table 3, the average value of the edge widths is in the range of 13.74 to 20.86. Referring to Table 3 and Table 4, it can be seen that the average value of the edge widths of the edge profiles increases as the blur value of the edge profile increases. For experiments having equivalent blur values, the variation in edge width due to noise is not large. The average of the optimal power factors applied to the gradient of the edge profile in the embodiment of the present invention (AWG) has a tendency to increase as the blur value increases in the range from 1.3755 to 1.5442.

As summarized in Table 4, in experiments on edge profiles having high noise levels, the average of edge widths determined by the embodiment of the present invention (AWG) has a range of 14.31 to 20.70. This is similar to the results of the experiments on low noise levels. However, the average of the optimal power factors used in the experiments on high noise levels has a range of 1.5891 to 1.7399. This is a value about 0.2 higher than the results of the experiments on low noise levels.

In addition, Table 3 and Table 4 show the average of kurtosis values of gradient profiles. A kurtosis value of 3.0 for a gradient profile means that the gradient profile has a perfect normal distribution. A kurtosis value of less than 3.0 for a gradient profile means that the gradient profile is flatter than a perfect normal distribution, and the edge width is slightly reduced compared with the edge width of an edge profile having a perfect normal distribution. Therefore, the edge width has a tendency to decrease as the kurtosis value of the gradient profile decreases.

In order to compare and evaluate the speed of the methods for determining an edge location, the time required to process 352,000 edge profiles was measured for each method, and the results are shown in Table 5 and Table 6. Measurements were performed in a Matlab environment on a desktop computer having an Intel Core i7, a 3.60 GHz CPU, and a 16 GB memory.

TABLE 5

| Operator | SM | GM | EF | SWG | AWG |
|---|---|---|---|---|---|
| Processing Time | 0.66 | 0.98 | 145.25 | 0.89 | 2.66 |

TABLE 6

| Operator | SM | GM | EF | SWG | AWG |
|---|---|---|---|---|---|
| Processing Time | 0.66 | 0.98 | 145.25 | 0.89 | 2.66 |

As shown in Table 5 and Table 6, it took 8 seconds or less to process all edge profiles for methods other than EF. The results of the comparison of AWG and EF show that, as summarized in Table 5, in the experiments on low noise levels, the embodiment of the present invention (AWG) is about 48 times faster than EF, and as summarized in Table 6, in the experiments on high noise levels, the embodiment of the present invention (AWG) is about 55 times faster than EF. The difference in processing time may act importantly when edge location determination processing for images having a large number of edge profiles should be completed within a limited time. In order to investigate the performance of the method for determining an edge location more accurately, additional experiments were performed by varying the blur value by a 0.1 interval in the range of 0.5 to 0.9. The blur value in this range is a range which is often observed in true images. Table 7 summarizes the results of the mean and maximum values of RMSE for the additional experiments.

TABLE 7

|  |  |  | SM | | | GM | | | EF | | | SWG | | | AWG | | |
|---|---|---|---|---|---|---|---|---|---|---|---|---|---|---|---|---|---|
| Test | $\sigma_b$ | $\sigma_y$ | $r_{mean}$ | $r_{max}$ | $L_{max}$ | $r_{mean}$ | $r_{max}$ | $L_{max}$ | $r_{mean}$ | $r_{max}$ | $L_{max}$ | $r_{mean}$ | $r_{max}$ | $L_{max}$ | Mean | Max | $L_{max}$ |
| 65 | 0.50 | 2/255 | 2.47 | 3.25 | −0.5 | 1.13 | 1.33 | −0.5 | 1.04 | 1.07 | 0.2 | 1.10 | 1.24 | 0.3 | 0.0082 | 0.0088 | −0.3 |
| 66 |  | 4/255 | 2.56 | 2.70 | −0.4 | 1.19 | 1.22 | −0.4 | 1.03 | 1.01 | −0.4 | 0.97 | 1.01 | 0.2 | 0.0152 | 0.0162 | −0.4 |
| 67 |  | 6/255 | 2.41 | 2.37 | 0.4 | 1.16 | 1.14 | 0.3 | 1.02 | 1.03 | 0.3 | 0.93 | 0.93 | 0.3 | 0.0231 | 0.0253 | 0.3 |
| 68 |  | 8/255 | 2.34 | 2.32 | −0.3 | 1.13 | 1.11 | −0.1 | 1.01 | 1.01 | 0.2 | 0.91 | 0.93 | 0.2 | 0.0307 | 0.0324 | −0.1 |
| 69 | 0.60 | 2/255 | 2.81 | 3.43 | 0.5 | 1.25 | 1.41 | 0.5 | 1.04 | 1.03 | −0.1 | 0.97 | 1.01 | 0.2 | 0.0078 | 0.0082 | −0.1 |
| 70 |  | 4/255 | 2.60 | 2.84 | −0.5 | 1.20 | 1.25 | −0.5 | 1.03 | 1.02 | 0.2 | 0.96 | 0.96 | 0.5 | 0.0156 | 0.0162 | 0.2 |
| 71 |  | 6/255 | 2.51 | 2.55 | −0.5 | 1.17 | 1.16 | −0.4 | 1.03 | 1.04 | −0.2 | 0.94 | 0.97 | 0.2 | 0.0231 | 0.0244 | −0.2 |
| 72 |  | 8/255 | 2.33 | 2.35 | −0.5 | 1.13 | 1.12 | 0.3 | 1.01 | 1.01 | 0.1 | 0.92 | 0.96 | 0.2 | 0.0316 | 0.0326 | 0.1 |
| 73 | 0.70 | 2/255 | 2.55 | 2.73 | −0.3 | 1.21 | 1.23 | −0.3 | 1.03 | 1.02 | 0.2 | 0.97 | 0.97 | 0.1 | 0.0082 | 0.0087 | 0.1 |

TABLE 7-continued

| Test | $\sigma_b$ | $\sigma_y$ | SM $r_{mean}$ | SM $r_{max}$ | SM $L_{max}$ | GM $r_{mean}$ | GM $r_{max}$ | GM $L_{max}$ | EF $r_{mean}$ | EF $r_{max}$ | EF $L_{max}$ | SWG $r_{mean}$ | SWG $r_{max}$ | SWG $L_{max}$ | AWG Mean | AWG Max | AWG $L_{max}$ |
|---|---|---|---|---|---|---|---|---|---|---|---|---|---|---|---|---|---|
| 74 |  | 4/255 | 2.59 | 2.64 | −0.5 | 1.22 | 1.24 | −0.5 | 1.03 | 1.04 | −0.5 | 0.94 | 0.95 | −0.5 | 0.0164 | 0.0173 | −0.5 |
| 75 |  | 6/255 | 2.40 | 2.37 | −0.4 | 1.16 | 1.11 | −0.1 | 1.02 | 1.02 | −0.1 | 0.94 | 0.95 | −0.1 | 0.0253 | 0.0280 | −0.1 |
| 76 |  | 8/255 | 2.32 | 2.30 | 0.4 | 1.14 | 1.12 | 0.4 | 1.02 | 1.03 | 0.0 | 0.94 | 0.96 | −0.5 | 0.0329 | 0.0348 | 0.0 |
| 77 | 0.80 | 2/255 | 2.60 | 3.23 | −0.1 | 1.25 | 1.35 | 0.0 | 1.04 | 1.04 | 0.0 | 0.98 | 0.99 | 0.4 | 0.0085 | 0.0089 | 0.0 |
| 78 |  | 4/255 | 2.55 | 2.57 | 0.0 | 1.19 | 1.21 | −0.3 | 1.02 | 1.03 | −0.3 | 0.98 | 0.96 | 0.3 | 0.0172 | 0.0185 | −0.3 |
| 79 |  | 6/255 | 2.43 | 2.40 | −0.2 | 1.16 | 1.15 | 0.5 | 1.03 | 1.02 | 0.5 | 0.98 | 0.95 | 0.5 | 0.0256 | 0.0280 | 0.5 |
| 80 |  | 8/255 | 2.30 | 2.30 | 0.4 | 1.14 | 1.16 | 0.4 | 1.02 | 1.03 | 0.4 | 0.95 | 0.92 | 0.2 | 0.0349 | 0.0379 | 0.4 |
| 81 | 0.90 | 2/255 | 2.67 | 3.58 | 0.0 | 1.24 | 1.46 | 0.0 | 1.03 | 1.04 | 0.5 | 1.01 | 1.04 | −0.4 | 0.0096 | 0.0092 | 0.5 |
| 82 |  | 4/255 | 2.55 | 2.65 | −0.1 | 1.20 | 1.22 | 0.1 | 1.03 | 1.03 | 0.1 | 0.99 | 0.99 | 0.1 | 0.0180 | 0.0189 | 0.1 |
| 83 |  | 6/255 | 2.40 | 2.53 | 0.0 | 1.16 | 1.20 | 0.0 | 1.03 | 1.03 | 0.2 | 1.00 | 1.02 | 0.2 | 0.0272 | 0.0288 | 0.2 |
| 84 |  | 8/255 | 2.29 | 2.23 | −0.2 | 1.14 | 1.13 | −0.2 | 1.02 | 1.01 | 0.2 | 0.99 | 1.00 | 0.5 | 0.0363 | 0.0386 | 0.2 |
| Mean |  |  | 2.48 | 2.67 |  | 1.18 | 1.22 |  | 1.03 | 1.03 |  | 0.97 | 0.99 |  |  |  |  |

According to the summary of the RMSE values in Table 7, SWG is superior to other methods when the blur value is in the range of 0.50 to 0.90. The embodiment of the present invention (AWG) and SWG have almost the same accuracy of the determination of an edge location when the blur value is 0.90. Since the symmetry of a gradient profile is easily influenced by noise and the asymmetry of the gradient profile increases within a blur range of 0.50 to 0.90, the performance of the embodiment of the present invention (AWG) is inferior to that of SWG in terms of the accuracy of the determination of an edge location within the blur range of 0.50 to 0.90. In the above blur range, SWG overcomes the problem well by using a power factor 2.0 higher than a power factor used by AWG Table 8 and Table 9 summarize the mean of edge widths of the edge profiles and the mean of applied power factors to the gradients used in the experiments of Table 7 for the embodiment of the present invention (AWG).

TABLE 8

| Test | $\sigma_b$ | $\sigma_y$ | Mean of Kurtoses of Gradient Profiles After Smoothing | Mean of Edge Widths after smoothing | Mean of Applied Power Factors |
|---|---|---|---|---|---|
| 65 | 0.50 | 2/255 | 3.6955 | 13.96 | 1.3809 |
| 66 |  | 4/255 | 4.2512 | 14.24 | 1.3874 |
| 67 |  | 6/255 | 4.7010 | 14.43 | 1.3919 |
| 68 |  | 8/255 | 5.1056 | 14.57 | 1.3953 |
| 69 | 0.60 | 2/255 | 3.7527 | 14.24 | 1.3875 |
| 70 |  | 4/255 | 4.3140 | 14.49 | 1.3933 |
| 71 |  | 6/255 | 4.6018 | 14.70 | 1.3983 |
| 72 |  | 8/255 | 4.8382 | 14.79 | 1.4005 |
| 73 | 0.70 | 2/255 | 3.7429 | 14.55 | 1.3948 |
| 74 |  | 4/255 | 4.1755 | 14.73 | 1.3991 |
| 75 |  | 6/255 | 4.5917 | 14.96 | 1.4045 |
| 76 |  | 8/255 | 4.7396 | 15.09 | 1.4075 |
| 77 | 0.80 | 2/255 | 3.6354 | 14.83 | 1.4015 |
| 78 |  | 4/255 | 4.1231 | 15.07 | 1.4072 |
| 79 |  | 6/255 | 4.4555 | 15.26 | 1.4117 |
| 80 |  | 8/255 | 4.5925 | 15.35 | 1.4138 |
| 81 | 0.90 | 2/255 | 3.5494 | 15.13 | 1.4086 |
| 82 |  | 4/255 | 4.0393 | 15.42 | 1.4155 |
| 83 |  | 6/255 | 4.4142 | 15.61 | 1.4199 |
| 84 |  | 8/255 | 4.5006 | 15.71 | 1.4223 |

TABLE 9

| Test | $\sigma_b$ | $\sigma_y$ | Mean of Kurtoses of Gradient Profiles After Smoothing | Mean of Edge Widths after Smoothing | Mean of Applied Power Factors |
|---|---|---|---|---|---|
| 85 | 0.50 | 10/255 | 5.4465 | 14.60 | 1.5960 |
| 86 |  | 20/255 | 5.8155 | 14.77 | 1.5999 |
| 87 |  | 30/255 | 5.5494 | 14.62 | 1.5964 |
| 88 |  | 40/255 | 5.2460 | 14.47 | 1.5930 |
| 89 | 0.60 | 10/255 | 5.1624 | 14.85 | 1.6020 |
| 90 |  | 20/255 | 5.6236 | 14.89 | 1.6029 |
| 91 |  | 30/255 | 5.2974 | 14.84 | 1.6017 |
| 92 |  | 40/255 | 5.0789 | 14.66 | 1.5974 |
| 93 | 0.70 | 10/255 | 4.7446 | 15.12 | 1.6084 |
| 94 |  | 20/255 | 5.2776 | 14.14 | 1.6088 |
| 95 |  | 30/255 | 5.2183 | 15.03 | 1.6063 |
| 96 |  | 40/255 | 4.9057 | 14.88 | 1.6027 |
| 97 | 0.80 | 10/255 | 4.8036 | 15.43 | 1.6156 |
| 98 |  | 20/255 | 5.0852 | 15.43 | 1.6156 |
| 99 |  | 30/255 | 5.0210 | 15.22 | 1.6107 |
| 100 |  | 40/255 | 4.6962 | 15.07 | 1.6072 |
| 101 | 0.90 | 10/255 | 4.7929 | 15.77 | 1.6238 |
| 102 |  | 20/255 | 4.9965 | 15.74 | 1.6230 |
| 103 |  | 30/255 | 4.8451 | 15.52 | 1.6177 |
| 104 |  | 40/255 | 4.6430 | 15.35 | 1.6138 |

Figure 10:
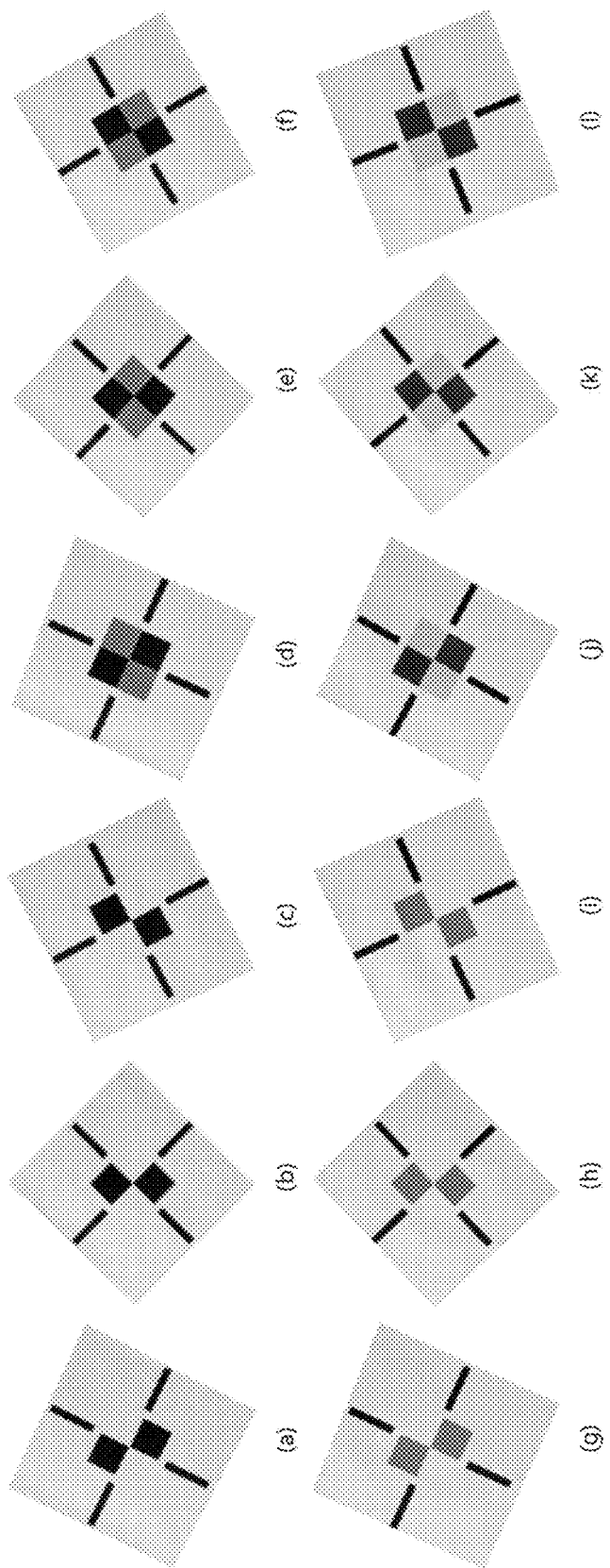
FIG. 10 is a diagram showing target images.

In order to compare the performance of sub-pixel edge location determination under various conditions generated in a true image, target images were used. The target images were acquired for four target sheets by a digital single-lens reflex camera (DSLR) having a manual focus function. Images were designed to have various contrasts and guide lines to collect edge profiles. FIG. 10 is a diagram showing target images. The size of each image was 360×360 pixels and center axes of four long black regions in each image were used as guide lines to collect edge profiles generated by contrast within a check board box in the center of each image. The average of blur values of the average of noises of the edge profiles collected from each image were calculated, and the average of kurtoses of gradient profiles in each target image was calculated. Table 10 shows the above average values.

TABLE 10

| Test ID | Target ID | Rotation | Blur in Raw Images | Noise in Raw Images | Mean of Kurtoses in Smoothed Images | Mean of Edge Widths in Smoothed Images | Mean of Applied Power Factors | Relevant Simulation Tests |
|---|---|---|---|---|---|---|---|---|
| A | 1 | 1 | 0.87 | 1.69/255 | 4.5602 | 15.15 | 1.4091 | 77, 81 |
| B |   | 2 | 0.89 | 1.79/255 | 4.8438 | 15.25 | 1.4114 | 77, 81 |
| C |   | 3 | 0.87 | 2.13/255 | 5.2103 | 15.67 | 1.4214 | 77, 78, 81, 82 |
| D | 2 | 1 | 0.66 | 3.49/255 | 3.1244 | 12.89 | 1.3554 | 69, 70, 73, 74 |
| E |   | 2 | 0.71 | 2.70/255 | 5.3953 | 12.93 | 1.3565 | 73, 74, 77, 78 |
| F |   | 3 | 0.69 | 2.67/255 | 3.4707 | 12.85 | 1.3544 | 69, 70, 73, 74 |
| G | 3 | 1 | 0.79 | 2.34/255 | 4.4253 | 13.76 | 1.3760 | 73, 74, 77, 78 |
| H |   | 2 | 0.85 | 2.70/255 | 4.7386 | 14.16 | 1.3856 | 77, 78, 81, 82 |
| I |   | 3 | 0.80 | 2.45/255 | 4.7630 | 13.83 | 1.3778 | 77, 78 |
| J | 4 | 1 | 0.79 | 2.27/255 | 4.5077 | 13.90 | 1.3795 | 73, 74, 77, 78 |
| K |   | 2 | 0.82 | 2.49/255 | 4.5293 | 14.34 | 1.3893 | 77, 78, 81, 82 |
| L |   | 3 | 0.79 | 2.42/255 | 4.3355 | 14.15 | 1.3853 | 73, 74, 77, 78 |

Blur values for images acquired for Targets 1, 2, 3, and 4 were about 0.9, 0.7, 0.8, and 0.8, respectively. The noise observed in the edge profile belonged to a low level of noise. Referring to Table 8 and Table 10, it can be seen that Tests A, B, and C for Target 1 have edge profiles having kurtoses similar to those of a simulation test, and thus, have similar edge widths and power factors to those of the simulation test applied by the embodiment (AWG) of the present invention.

TABLE 11

| Target 1 | | | | | | Target 2 | | | | | |
|---|---|---|---|---|---|---|---|---|---|---|---|
| Operators | SM | GM | EF | SWG | AWG | Operators | SM | GM | EF | SWG | AWG |
| SM | 0 | 0.0579 | 0.1023 | 0.0909 | 0.0701 | SM | 0 | 0.0219 | 0.0347 | 0.0397 | 0.0252 |
| GM | 0.0579 | 0 | 0.0152 | 0.0335 | 0.0131 | GM | 0.0219 | 0 | 0.0153 | 0.0181 | 0.0056 |
| EF | 0.1023 | 0.0152 | 0 | 0.0294 | 0.0103 | EF | 0.0347 | 0.0153 | 0 | 0.0292 | 0.0155 |
| SWG | 0.0909 | 0.0335 | 0.0294 | 0 | 0.0220 | SWG | 0.0397 | 0.0181 | 0.0292 | 0 | 0.0162 |
| AWG | 0.0701 | 0.0131 | 0.0103 | 0.0220 | 0 | AWG | 0.0252 | 0.0056 | 0.0155 | 0.0162 | 0 |

| Target 3 | | | | | | Target 4 | | | | | |
|---|---|---|---|---|---|---|---|---|---|---|---|
| Operators | SM | GM | EF | SWG | AWG | Operators | SM | GM | EF | SWG | AWG |
| SM | 0 | 0.0538 | 0.0942 | 0.0885 | 0.0572 | SM | 0 | 0.0595 | 0.1039 | 0.0957 | 0.0677 |
| GM | 0.0538 | 0 | 0.0142 | 0.0350 | 0.0082 | GM | 0.0595 | 0 | 0.0176 | 0.0365 | 0.0102 |
| EF | 0.0942 | 0.0142 | 0 | 0.0328 | 0.0138 | EF | 0.1039 | 0.0176 | 0 | 0.0346 | 0.0122 |
| SWG | 0.0885 | 0.0350 | 0.0328 | 0 | 0.0324 | SWG | 0.0957 | 0.0365 | 0.0346 | 0 | 0.0292 |
| AWG | 0.0572 | 0.0082 | 0.0136 | 0.0324 | 0 | AWG | 0.0677 | 0.0102 | 0.0112 | 0.0292 | 0 |

Table 11 summarizes the average of the distances between edge locations determined by the methods for determining an edge location for the target images acquired for each target sheet. Targets 1, 3 and 4 show accurate results in order of SWG AWG, EF, GM and SM, and Target 2 shows accurate results in order of SWG, AWG GM, and SM. SWG shows the highest accuracy because the range of blur values (0.7-0.9) of the edge profiles in the target images was in the range of 0.5 to 0.9.

Figure 11:
FIG. 11 is a diagram showing a Lena image.
Figure 12:
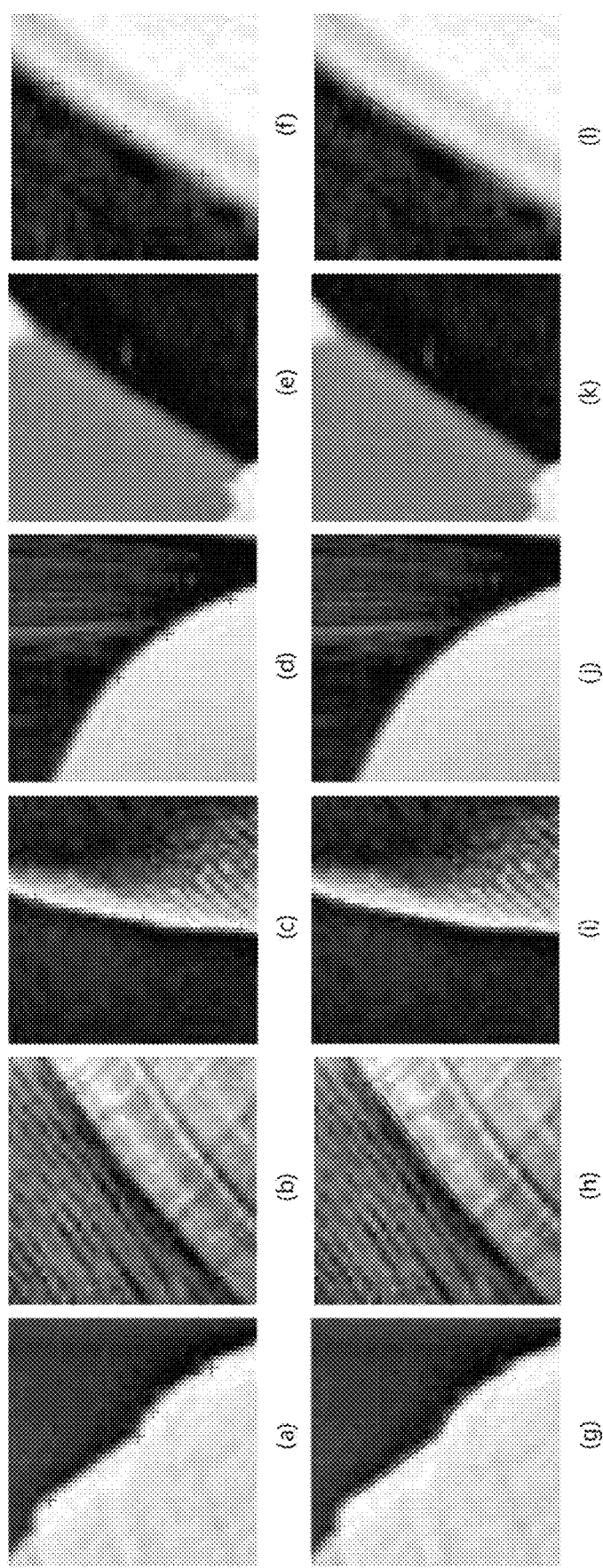
FIG. 12 is an enlarged view of image chips obtained from a Lena image.

Next, the performance of methods for determining the edge location of a sub-pixel was compared using a Lena image of a 512×512 pixel size as a test image. FIG. 11 is a diagram showing a Lena image. FIG. 12 is an enlarged view of image chips obtained from a Lena image. As illustrated in FIG. 12, by cropping regions in an original image, six image chips of a 51×51 pixel size having clear edge properties were obtained. Table 12 summarizes the properties of edge profiles in each imaging chip.

TABLE 12

| Test ID | Blur in Raw Images ($\sigma_b$) | Observed Noise ($\sigma_y$) | Mean of the Edge Widths after Smoothing (in pixels) | Mean of the Applied Power Factors in the AWG (AWG-0.2) | Relevant Simulation Tests |
|---|---|---|---|---|---|
| A | 0.88 | 3.49/255 | 15.86 | 1.4260 | 77, 78, 81, 82 |
| B | 1.15 | 12.09/255 | 16.07 | 1.4307 (1.6307) | 41, 42, 45, 46 |
| C | 0.70 | 4.12/255 | 13.98 | 1.3812 | 74, 75 |
| D | 0.86 | 3.56/255 | 15.93 | 1.4275 | 77, 78, 81, 82 |
| E | 1.18 | 4.17/255 | 17.42 | 1.4628 | 10, 11, 14, 15 |
| F | 1.55 | 3.64/255 | 17.68 | 1.4689 | 17, 18, 21, 22 |

Similar to the edge profiles in the target image, the edge profiles in the Lena image also had a smaller kurtosis value than those of the simulation test, except for Test B, and a power factor applied by the adaptive weighting of gradients (AWG) was reduced to 0.07. However, the degree of reduction may be considered to be insignificant to change an edge location calculated by AWG Edge profiles in all image chips belonged to a low level of noise except for an image chip of Test B. Edge profiles in the image chip for Test B belonged to a high level of noise. Therefore, for comparison, two versions of AWG were applied to the edge profiles in the image chips. The first version used a power factor having an average of 1.4985. This is a value derived early by error propagation. The second version (AWG+0.2) used a power factor having an average of 1.6985. This is to offset the distortion of a gradient profile from symmetry due to the increase in noise.

The lower figures of FIG. 12 show edge traces determined by AWG In the case of Tests A, C, and D, SWG shows the most accurate sub-pixel edge location determination. The adaptive weighting of gradients (AWG) shows the most accurate performance in Tests E and F, and AWG+0.2 shows the most accurate performance in Test B.

Table 13 summarizes the average of the distances between edge locations determined by methods for determining the edge location of a sub-pixel. In terms of the accuracy of edge location determination, in the case of Test A, it is sorted in order of SWG, AWG, EF, GM, and SM. In the case of Test B, it is sorted in order of AWG+0.2, EF, GM, AWG, SWG, and SM. In the case of Test C, it is sorted in order of SWG, AWG, GM, EF, and SM. In the case of Test D, it is sorted in order of SWG, AWG, GM, EF, and SM. In the case of Test E, it is sorted in order of AWG, EF, GM, SWG, and SM. In the case of Test F, it is sorted in order of AWG, EF, GM, SWG, and SM. In summary, when SWG was the best method, AWG was the second best method. However, when AWG was the best method, SWG was not the second best method. This means that AWG is more reliable than SWG when applied to general edge profiles.

Figure 13:
FIG. 13 is a diagram showing an image obtained for the exterior of a building.
Figure 14:
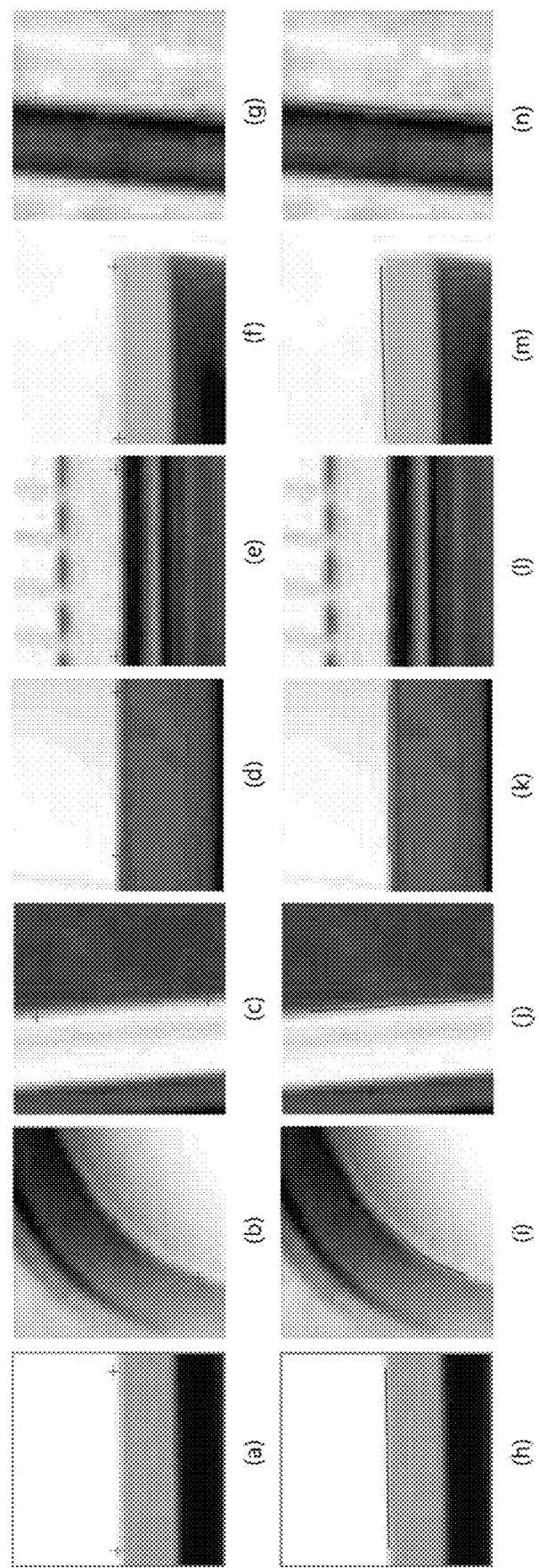
FIG. 14 is a diagram showing image chips obtained from an image of the exterior of a building.

Additional experiments were performed with test images obtained for a building facade by the same camera used to capture the target images. FIG. 13 is a diagram showing an image obtained for the exterior of a building. Seven image chips were obtained by image cropping. FIG. 14 is a diagram showing image chips obtained from an image of the exterior of a building. As in the figures illustrated in an upper portion of FIG. 14, the same guide marks were generated.

TABLE 13

| | Test A | | | | | | Test B | | | | | |
|---|---|---|---|---|---|---|---|---|---|---|---|---|
| Operators | SM | GM | EF | SWG | AWG | Operators | SM | GM | EF | SWG | AWG | AWG + 0.2 |
| SM | 0 | 0.0332 | 0.0381 | 0.0644 | 0.0444 | SM | 0 | 0.1863 | 0.2194 | 0.3713 | 0.2107 | 0.2771 |
| GM | 0.0332 | 0 | 0.0051 | 0.0312 | 0.0115 | GM | 0.1863 | 0 | 0.0331 | 0.1850 | 0.0244 | 0.0908 |
| EF | 0.0381 | 0.0051 | 0 | 0.0263 | 0.0072 | EF | 0.2194 | 0.0331 | 0 | 0.1519 | 0.0147 | 0.0577 |
| SWG | 0.0644 | 0.0312 | 0.0263 | 0 | 0.0200 | SWG | 0.3713 | 0.1850 | 0.1519 | 0 | 0.1605 | 0.0942 |
| AWG | 0.0444 | 0.0115 | 0.0072 | 0.0200 | 0 | AWG | 0.2107 | 0.0244 | 0.0147 | 0.1605 | 0 | 0.0664 |
| | | | | | | AWG − 0.2 | 0.2771 | 0.0908 | 0.0577 | 0.0942 | 0.0664 | 0 |

| | Test C | | | | | | Test D | | | | |
|---|---|---|---|---|---|---|---|---|---|---|---|
| Operators | SM | GM | EF | SWG | AWG | Operators | SM | GM | EF | SWG | AWG |
| SM | 0 | 0.0247 | 0.0263 | 0.0503 | 0.0308 | SM | 0 | 0.0235 | 0.0259 | 0.0443 | 0.0320 |
| GM | 0.0247 | 0 | 0.0028 | 0.0256 | 0.0071 | GM | 0.0235 | 0 | 0.0035 | 0.0231 | 0.0161 |
| EF | 0.0263 | 0.0028 | 0 | 0.0241 | 0.0046 | EF | 0.0259 | 0.0035 | 0 | 0.0218 | 0.0141 |
| SWG | 0.0503 | 0.0256 | 0.0241 | 0 | 0.0198 | SWG | 0.0443 | 0.0231 | 0.0218 | 0 | 0.0198 |
| AWG | 0.0308 | 0.0071 | 0.0046 | 0.0198 | 0 | AWG | 0.0320 | 0.0161 | 0.0141 | 0.0198 | 0 |

| | Test E | | | | | | Test F | | | | |
|---|---|---|---|---|---|---|---|---|---|---|---|
| Operators | SM | GM | EF | SWG | AWG | Operators | SM | GM | EF | SWG | AWG |
| SM | 0 | 0.0794 | 0.0921 | 0.1409 | 0.1077 | SM | 0 | 0.0361 | 0.0367 | 0.0711 | 0.0339 |
| GM | 0.0794 | 0 | 0.0130 | 0.0616 | 0.0285 | GM | 0.0361 | 0 | 0.0087 | 0.0359 | 0.0181 |
| EF | 0.0921 | 0.0130 | 0 | 0.0491 | 0.0201 | EF | 0.0367 | 0.0087 | 0 | 0.0379 | 0.0133 |
| SWG | 0.1409 | 0.0616 | 0.0491 | 0 | 0.0387 | SWG | 0.0711 | 0.0359 | 0.0379 | 0 | 0.0404 |
| AWG | 0.1077 | 0.0285 | 0.0201 | 0.0387 | 0 | AWG | 0.0339 | 0.0181 | 0.0133 | 0.0404 | 0 |

TABLE 14

| Test ID | Blur in Raw Images | Noise | Mean of Kurtoses in Smoothed Images | Mean of Edge Widths in Smoothed Images | Mean of Applied Power Factors | Relevant Simulation Tests |
|---|---|---|---|---|---|---|
| A | 0.85 | 2.34/255 | 3.8649 | 13.86 | 1.3785 | 77, 78, 81, 82 |
| B | 0.89 | 4.03/255 | 4.8450 | 13.07 | 1.3597 | 78, 79, 82, 83 |
| C | 1.14 | 2.53/255 | 3.4097 | 13.84 | 1.3780 | 9, 10, 13, 14 |
| D | 0.84 | 3.36/255 | 4.5076 | 13.20 | 1.3629 | 77, 78, 81, 82 |
| E | 0.92 | 4.07/255 | 3.5109 | 13.67 | 1.3740 | 6, 7, 10, 11 |
| F | 1.21 | 4.61/255 | 4.2130 | 14.13 | 1.3849 | 10, 11, 14, 15 |
| G | 1.49 | 4.90/255 | 2.6052 | 13.71 | 1.3751 | 14, 15, 18, 19 |

As summarized in Table 14, it can be seen that the kurtoses of gradient profiles in the image chips were smaller than those of the simulation test, and the average of power factors applied by the adaptive weighting of gradients (AWG) was smaller than that of the simulation test. The power factor reduction was in the range of 0.02 to 0.10, and is considered to be insignificant to change an edge location calculated by the adaptive weighting of gradients (AWG). The lower figures of FIG. 14 show edge locations determined by the adaptive weighting of gradients (AWG). Table 15 summarizes the average of the distances between edge locations calculated by methods for determining an edge location.

All edge profiles collected from the image chips belong to a low level of noise. Therefore, according to Table 1, Table 7, and Table 15, the performance of the methods for determining an edge location may be sorted as follows in order of accuracy. The method for determining an edge location based on the squared weighting of gradients (SWG) showed the best accuracy in Tests A, B, D, and E. The method for determining an edge location based on the adaptive weighting of gradients (AWG) showed the best accuracy in Tests C, F, and G.

Summarizing the results of the experiments described above, the method for determining an edge location based on the adaptive weighting of gradients (AWG) was the best

| Test A | | | | | | Test B | | | | | |
|---|---|---|---|---|---|---|---|---|---|---|---|
| Operators | SM | GM | EF | SWG | AWG | Operators | SM | GM | EF | SWG | AWG |
| SM | 0 | 0.0204 | 0.0269 | 0.0364 | 0.0244 | SM | 0 | 0.0538 | 0.0587 | 0.0549 | 0.0560 |
| GM | 0.0204 | 0 | 0.0122 | 0.0175 | 0.0099 | GM | 0.0538 | 0 | 0.0105 | 0.0259 | 0.1066 |
| EF | 0.0269 | 0.0122 | 0 | 0.0246 | 0.0109 | EF | 0.0587 | 0.0105 | 0 | 0.0309 | 0.1133 |
| SWG | 0.0364 | 0.0175 | 0.0246 | 0 | 0.0159 | SWG | 0.0549 | 0.0259 | 0.0309 | 0 | 0.0941 |
| AWG | 0.0244 | 0.0099 | 0.0109 | 0.0159 | 0 | AWG | 0.0560 | 0.1066 | 0.1133 | 0.0941 | 0 |

| Test C | | | | | | Test D | | | | | |
|---|---|---|---|---|---|---|---|---|---|---|---|
| Operators | SM | GM | EF | SWG | AWG | Operators | SM | GM | EF | SWG | AWG |
| SM | 0 | 0.0649 | 0.0717 | 0.1220 | 0.0698 | SM | 0 | 0.0677 | 0.0773 | 0.1153 | 0.0760 |
| GM | 0.0649 | 0 | 0.0199 | 0.0572 | 0.0119 | GM | 0.0677 | 0 | 0.0107 | 0.0476 | 0.0083 |
| EF | 0.0717 | 0.0199 | 0 | 0.0524 | 0.0116 | EF | 0.0773 | 0.0107 | 0 | 0.0380 | 0.0036 |
| SWG | 0.1220 | 0.0572 | 0.0524 | 0 | 0.0527 | SWG | 0.1153 | 0.0476 | 0.0380 | 0 | 0.0393 |
| AWG | 0.0698 | 0.0119 | 0.0116 | 0.0527 | 0 | AWG | 0.0760 | 0.0083 | 0.0036 | 0.0393 | 0 |

| Test E | | | | | | Test F | | | | | |
|---|---|---|---|---|---|---|---|---|---|---|---|
| Operators | SM | GM | EF | SWG | AWG | Operators | SM | GM | EF | SWG | AWG |
| SM | 0 | 0.0329 | 0.0389 | 0.0568 | 0.0399 | SM | 0 | 0.0616 | 0.0748 | 0.1203 | 0.0613 |
| GM | 0.0329 | 0 | 0.0076 | 0.0242 | 0.0094 | GM | 0.0616 | 0 | 0.0132 | 0.0587 | 0.0087 |
| EF | 0.0389 | 0.0076 | 0 | 0.0219 | 0.0053 | EF | 0.0748 | 0.0132 | 0 | 0.0491 | 0.0150 |
| SWG | 0.0568 | 0.0242 | 0.0219 | 0 | 0.0204 | SWG | 0.1203 | 0.0587 | 0.0491 | 0 | 0.0591 |
| AWG | 0.0399 | 0.0094 | 0.0053 | 0.0204 | 0 | AWG | 0.0613 | 0.0067 | 0.0150 | 0.0591 | 0 |

| Test G | | | | | |
|---|---|---|---|---|---|
| Operators | SM | GM | EF | SWG | AWG |
| SM | 0 | 0.0439 | 0.0540 | 0.0955 | 0.0429 |
| GM | 0.0439 | 0 | 0.0145 | 0.0521 | 0.0107 |
| EF | 0.0540 | 0.0145 | 0 | 0.0483 | 0.0139 |
| SWG | 0.0955 | 0.0521 | 0.0483 | 0 | 0.0549 |
| AWG | 0.0429 | 0.0107 | 0.0139 | 0.0549 | 0 | method when a blur in an original edge profile was greater than 0.90. The method for determining an edge location based on the squared weighting of gradients (SWG) was the best method when the blur was in the range of 0.50 to 0.90. Therefore, according to an embodiment of the present invention, by combining the advantages of each of the method for determining an edge location based on the adaptive weighting of gradients (AWG) and the method for determining an edge location based on the squared weighting of gradients (SWG), an edge location may be determined more accurately. The method for determining an edge location according to the embodiment of the present invention is at least 70 times faster than a typical method which is known to be most accurate, and may obtain more accurate edge location determination results with a small amount of computation.

The method according to the embodiment of the present invention may be, for example, written as a program which may be executed on a computer, and may be implemented in a general purpose digital computer which operates the program using a computer-readable recording medium. The computer-readable recording medium may be a volatile memory such as a Static RAM (SRAM), a Dynamic RAM (DRAM), a Synchronous DRAM (SDRAM), a non-volatile memory such as a Read Only Memory (ROM), a Programmable ROM (PROM), an Electrically programmable ROM (EPROM), an Electrically erasable and Programmable ROM (EEPROM), a flash memory device, a Phase-change RAM (PRAM), a Magnetic RAM (MRAM), a Resistive RAM (RRAM), and a Ferroelectric RAM, a floppy disk, a hard disk, or an optical read medium, for example, a storage medium in the form of CD-ROM, DVD, and the like, but is not limited thereto.

It is to be understood that the above-described embodiments are provided to facilitate understanding of the present invention, and do not limit the scope of the present invention, and it is to be understood that various modified embodiments are also within the scope of the present invention. It is to be understood that the technical scope of the present invention should be determined by the technical idea of the claims, and it is to be understood that the technical scope of the present invention is not to be limited to the literal description of the claims, but in practice, the technical value extends to even inventions of equal categories.

The invention claimed is:

1. A method for determining an edge location, the method comprising the steps of:
   determining a power factor based on an edge width of an edge profile in an image, the power factor to be applied to a gradient of the edge profile for determining an edge location;
   calculating a difference value between adjacent pixels in the edge profile to generate the gradient; and
   determining the edge location by applying the power factor, determined based on the edge width, to the gradient.

2. The method of claim 1, wherein the step of determining a power factor comprises a step of determining, based on a correspondence relationship between a preset edge width and a power factor, the power factor corresponding to the edge width.

3. The method of claim 1, wherein the step of determining a power factor comprises a step of determining, based on a preset kernel size and a correspondence relationship between an edge width and a power factor, the power factor corresponding to the kernel size of the edge profile and the edge width.

4. The method of claim 2, further comprising the steps of:
   calculating the propagation of an error per power factor for predetermined edge profiles having various edge widths; and
   determining a power factor that generates a minimum error in the propagation of an error to calculate a correspondence relationship between the edge width and the power factor.

5. The method of claim 4, wherein the step of calculating the propagation of an error comprises the steps of:
   calculating, for each of the edge profiles having various blur values, a gradient vector between values of the adjacent pixels;
   generating a weighting vector to be applied to the edge profiles per power factor applied to the gradient;
   calculating, based on the weighting vector, a partial derivative of the edge location for the weighting vector per power factor;
   calculating, based on the gradient, a partial derivative for a gradient of the weighting vector per power factor;
   calculating, based on a standard deviation of an error of each of the edge profiles, a dispersion of the gradient vector; and
   calculating, based on the dispersion of the gradient, the partial derivative of the edge location for the weighting vector, the partial derivative for the gradient of the weighting vector, a difference value between a predicted edge location and a true edge location per power factor, the propagation of the error per power factor.

6. The method of claim 5, wherein the step of calculating a correspondence relationship between the edge width and the power factor comprises the steps of:
   determining, for each of the various blur values, a power factor that generates a minimum error in the propagation of an error to calculate a correspondence relationship between a blur and the power factor;
   calculating a correspondence relationship between the blur and edge width of the edge profiles; and
   relating, based on the correspondence relationship between the blur and the power factor and the correspondence relationship between the blur and the edge width, the edge width directly to the power factor.

7. The method of claim 5, wherein the partial derivative of an edge location for the weighting vector is calculated according to Equation 1 below:

$$\frac{\partial l}{\partial w} = \frac{x}{\sum_{i=1}^{n-1} w_i} - \frac{\sum_{i=1}^{n-1} w_i x_i}{\left(\sum_{i=1}^{n-1} w_i\right)^2} \qquad [\text{Equation 1}]$$

in Equation 1 above, l is an edge location, x is a vector representing the coordinate of the middle of the edge profile, $x_i$ is the coordinate value of the middle of i-th segment in the edge profile, w is the weighting vector, Wi is a weight value of the i-th segment in the weighting vector, and n is the number of pixels in the edge profile.

8. The method of claim 7, wherein the partial derivative for a gradient of the weighting vector is calculated according to Equation 2 below:

$$\frac{\partial w}{\partial g} = \text{diag}(p \cdot g^{p-1}) \qquad [\text{Equation 2}]$$

in Equation 2 above, w is the weighting vector, g is the gradient, and p is a power factor of the gradient.

9. The method of claim 8, wherein the dispersion of the gradient is calculated according to Equation 3 below:

$$D\{g\} = B \cdot \sigma_y^2 \cdot I_n B^T = \sigma_y^2 BB^T \qquad \text{[Equation 3]}$$

$$B_{(n-1)\times n} = \begin{bmatrix} -1 & 1 & 0 & \cdots & 0 \\ 0 & -1 & 1 & \cdots & 0 \\ \vdots & \vdots & \vdots & \ddots & 0 \\ 0 & 0 & \cdots & -1 & 1 \end{bmatrix}$$

in Equation 3 above, D{g} is the dispersion of the gradient, $\sigma_y$ is a standard deviation of an error of a brightness value of the edge profile, n is the number of segments of the edge profile, and In is an identity matrix.

10. The method of claim 9, wherein the propagation of an error is calculated according to Equation 4 and Equation 5 below:

$$MSE\{l\} = D\{l\} + (l - l^{true})^2 \qquad \text{[Equation 4]}$$

$$D\{l\} = \frac{\partial l}{\partial w} \times \frac{\partial w}{\partial g} \times D\{g\} \times \left[\frac{\partial w}{\partial g}\right]^T \times \left[\frac{\partial l}{\partial w}\right]^T \qquad \text{[Equation 5]}$$

in Equation 4 and Equation 5, MSE{l} is the propagation of an error, D{l} is a dispersion of an edge location, D{g} is the dispersion of the gradient, $\partial l/\partial w$ $$\frac{\partial l}{\partial w}$$

is the partial derivative of the edge location for the weighting vector, $\partial w/\partial g$ $$\frac{\partial w}{\partial g}$$

is a partial derivative for me gradient of the weighting vector, and $1-1^{true}$ is a difference value between an estimated edge location and a true edge location.

11. The method of claim 1, further comprising a step of calculating a blur value for an edge profile to predict an edge location, wherein the step of determining a power factor to be applied to a gradient determines a power factor to be applied to a gradient of the edge profile according to the degree of the blur.

12. The method of claim 11, wherein the step of determining a power factor to be applied to a gradient comprises the steps of:
when the blur value of the edge profile is greater than 0.9 or less than 0.5, determining the power factor to be applied to the gradient based on the edge width of the edge profile; and
when the blur value of the edge profile is in the range of 0.5 to 0.9, determining the power factor to be applied to the gradient of the edge profile with squared weighting.

13. A computer-readable recording medium having recorded thereon a program for executing the method for determining an edge location of claim 1.

14. A device for determining an edge location comprising at least one processor, wherein the processor:
determines a power factor based on the edge width of an edge profile in an image, the power factor to be applied to a gradient of the edge profile for deter mining an edge location;
calculates a difference value between values of adjacent pixels in the edge profile to generate the gradient; and
determines the edge location by applies the power factor, determined based on the edge width, to the gradient.

15. The device of claim 14, wherein the processor determines, based on a preset kernel size and a correspondence relationship between an edge width and a power factor, the power factor corresponding to the kernel size of the edge profile and the edge width.

16. The device of claim 15, wherein the processor:
calculates the propagation of an error per power factor for predetermined edge profiles having various edge widths; and
determines a power factor that generates a minimum error in the propagation of an error to calculate a correspondence relationship between the edge width and the power factor.

17. The device of claim 16, wherein the processor:
calculates, for each of the edge profiles having various blur values, a gradient vector between values of the adjacent pixels;
generates a weighting vector to be applied to the edge profiles per power factor applied to the gradient;
calculates, based on the weighting vector, a partial derivative of the edge location for the weighting vector per power factor;
calculates, based on the gradient, a partial derivative for a gradient of the weighting vector per power factor;
calculates, based on a standard deviation of an error of each of the edge profiles, a dispersion of the gradient vector; and
calculates, based on the dispersion of the gradient, the partial derivative of the edge location for the weighting vector, the partial derivative for the gradient of the weighting vector, a difference value between a predicted edge location and a true edge location per power factor, the propagation of the error per power factor.

18. The device of claim 17, wherein the processor:
determines, for each of the various blur values, a power factor that generates a minimum error in the propagation of an error to calculate a correspondence relationship between a blur and the power factor;
calculates a correspondence relationship between the blur and edge widths of the edge profiles; and
relates, based on the correspondence relationship between the blur and the power factor and the correspondence relationship between the blur and the edge width, the edge width directly to the power factor.

19. The device of claim 14, wherein the processor:
calculates a blur value for an edge profile to predict an edge location, and
when the blur value of the edge profile is greater than 0.9 or less than 0.5, determines the power factor to be applied to the gradient based on the edge width of the edge profile; and
when the blur value of the edge profile is in the range of 0.5 to 0.9, determines the power factor to be applied to the gradient of the edge profile with squared weighting.

\* \* \* \* \*